(12) United States Patent
Orihara

(10) Patent No.: US 10,943,165 B2
(45) Date of Patent: Mar. 9, 2021

(54) ANTENNA DEVICE

(71) Applicant: DEXERIALS CORPORATION, Tokyo (JP)

(72) Inventor: Katsuhisa Orihara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/312,197

(22) PCT Filed: Jun. 23, 2017

(86) PCT No.: PCT/JP2017/023216
§ 371 (c)(1),
(2) Date: Dec. 20, 2018

(87) PCT Pub. No.: WO2018/012254
PCT Pub. Date: Jan. 18, 2018

(65) Prior Publication Data
US 2019/0236432 A1 Aug. 1, 2019

(30) Foreign Application Priority Data

Jul. 11, 2016 (JP) .............................. JP2016-136759

(51) Int. Cl.
*G06K 19/077* (2006.01)
*H04B 5/02* (2006.01)
(Continued)

(52) U.S. Cl.
CPC ... *G06K 19/07779* (2013.01); *G06K 19/0772* (2013.01); *G06K 19/07749* (2013.01);
(Continued)

(58) Field of Classification Search
CPC ....... G06K 19/07779; G06K 19/07749; H04B 5/02; H04B 5/0081; H04B 5/0031;
(Continued)

(56) References Cited

U.S. PATENT DOCUMENTS

2014/0191916 A1* 7/2014 Ito .................... H01Q 1/2216
343/788
2014/0198006 A1* 7/2014 Nakano ............ G06K 19/07794
343/788
(Continued)

FOREIGN PATENT DOCUMENTS

CN 103797642 A 5/2014
CN 105103373 A 11/2015
(Continued)

OTHER PUBLICATIONS

Sep. 12, 2017 International Search Report issued in International Patent Application No. PCT/JP2017/023216.
(Continued)

*Primary Examiner* — Brian Wilson
(74) *Attorney, Agent, or Firm* — Oliff PLC

(57) ABSTRACT

An antenna device incorporated in an electronic apparatus and communicating with an external device via an electromagnetic field signal, including: an antenna coil inductively coupled to the external device and provided by winding around a conducting wire in planar shape; a magnetic sheet arranged to overlap with the antenna coil mutually along the antenna coil by inserting the magnetic sheet into a coil opening provided at center side of the antenna coil; and a metallic cover formed with an opening near an end of the metallic cover and arranged at surface side of the antenna coil opposing to the external device, wherein the antenna coil is arranged to overlap with the metallic cover in a region between the opening and the end of the metallic cover at a backside surface of the metallic cover opposite to a surface of the metallic cover opposing to the external device.

8 Claims, 21 Drawing Sheets

(51) Int. Cl.
- *H01Q 1/38* (2006.01)
- *H01Q 7/06* (2006.01)
- *H01Q 1/24* (2006.01)
- *H01Q 1/52* (2006.01)
- *H04B 5/00* (2006.01)
- *H01Q 1/22* (2006.01)
- *H01Q 7/00* (2006.01)

(52) U.S. Cl.
CPC ......... *G06K 19/07773* (2013.01); *H01Q 1/24* (2013.01); *H01Q 1/38* (2013.01); *H01Q 1/526* (2013.01); *H01Q 7/06* (2013.01); *H04B 5/0081* (2013.01); *H04B 5/02* (2013.01); *H01Q 1/2216* (2013.01); *H01Q 7/00* (2013.01)

(58) Field of Classification Search
CPC .. H01Q 1/38; H01Q 7/06; H01Q 1/24; H01Q 1/243; H01Q 1/526; H01Q 1/2208; H01Q 1/2216; H01Q 7/00
USPC ............................ 340/572.6, 572.7; 343/788
See application file for complete search history.

(56) References Cited

U.S. PATENT DOCUMENTS

| | | | |
|---|---|---|---|
| 2016/0064822 A1* | 3/2016 | Orihara | ............ G06K 19/07771 343/702 |
| 2016/0336645 A1* | 11/2016 | Orihara | ................ G06K 19/077 |

FOREIGN PATENT DOCUMENTS

| | | | | |
|---|---|---|---|---|
| JP | 2007-325054 A | 12/2007 | | |
| JP | 5135450 B2 | 2/2013 | | |
| JP | 5673854 B2 | 2/2015 | | |
| JP | 2015-136041 A | 7/2015 | | |
| JP | 2016-058825 A | 4/2016 | | |
| WO | WO-2015108054 A1 * | 7/2015 | ............. | H01Q 1/243 |

OTHER PUBLICATIONS

Mar. 3, 2020 Office Action issued in Chinese Patent Application No. 201780039140.1.
Oct. 16 2020 Office Action issued in Chinese Patent Application No. 201780039140.1.

* cited by examiner

ANTENNA DEVICE

BACKGROUND OF THE INVENTION

Field of the Invention

The present invention relates to an antenna device incorporated in an electronic apparatus and communicating with an external device such as a transmitter via an electromagnetic field signal. The present application claims priority based on Japanese Patent Application No. 2016-136759 filed in Japan on Jul. 11, 2016, which is incorporated by reference herein.

Description of Related Art

In electronic apparatuses such as portable telephone, an antenna module for RFID (Radio Frequency Identification) has been used to mount a function of Near Field Communication. This antenna module communicates with an antenna coil mounted on a transmitter such as a reader/writer by using inductive coupling. That is, in this antenna module, magnetic field from the reader/writer is received by an antenna coil and thereby converted into electric power, which can drive an IC which functions as a communication processing unit.

To reliably perform communication, the antenna module is required to receive, at the antenna coil, magnetic flux equal to or more than a certain value from the reader/writer. For this reason, in an antenna module according to conventional example, a loop coil is provided in a housing of a portable telephone or the like, and this coil receives magnetic flux from the reader/writer. In the antenna module incorporated in an electronic apparatus such as a portable telephone, magnetic flux from the reader/writer are caused to bounce back by eddy current occurring because a metal plate such as a battery pack or a substrate inside the apparatus receives a magnetic field from the reader/writer. The magnetic flux bounced back by the metal plate or the substrate flows toward outer periphery to bypass the metal plate or the substrate, so magnetic field at the outer periphery tends to be strong and magnetic field tends to be weak near a center of the metal plate or the substrate.

In Patent Literature 1, it is proposed to arrange an antenna coil at an end of a metal plate (first conductor) such as a battery pack or a substrate in an electronic apparatus, in order to improve communication efficiency of NFC (Near Field Communication) antenna module used by incorporated in the electronic apparatus using such property. In addition, in Patent Literature 2, it is proposed to enable communication by inhibiting absorption of electromagnetic wave for communication by a metallic cover, by exposing at least a part of an antenna coil to an opening of the metallic cover, when an antenna module is mounted in a housing covered with the metallic cover of an antenna device using magnetic shielding effect of such metal plate.

Patent Literature 1: JP 5135450 B
Patent Literature 2: JP 5673854 B

SUMMARY OF THE INVENTION

However, in an electronic apparatus such as portable communication terminal progressing its miniaturization and multi-functionalization, there are many requests for improving design freedom by avoiding its structural restriction. In addition, it is preferable that a number or a size of an opening provided at the metallic cover for a purpose of inhibiting absorption of electromagnetic wave for communication by the metallic cover will be necessity minimum number or size, in order to secure strength of the metallic cover of the electronic apparatus. In other words, it is desired to secure high communication performance without structural restriction, while securing strength of the electronic apparatus in which the opening is provided at the metallic cover.

The present invention is proposed considering these problems, and the purpose of the present invention is to provide new and improved antenna device capable of securing higher communication performance without structural restriction of the electronic apparatus having the opening at the metallic cover.

One embodiment of the present invention is an antenna device incorporated in an electronic apparatus and communicating with an external device via an electromagnetic field signal, comprising: an antenna coil inductively coupled to the external device and provided by winding around a conducting wire in planar shape; a magnetic sheet arranged to overlap with the antenna coil mutually along the antenna coil by inserted into a coil opening provided at center side of the antenna coil; and a metallic cover formed with an opening near an end of the metallic cover and arranged at surface side of the antenna coil opposing to the external device, wherein the antenna coil is arranged to overlap with the metallic cover in a region between the opening and the end of the metallic cover at a backside surface of the metallic cover opposite to a surface of the metallic cover opposing to the external device.

According to one embodiment of the present invention, magnetic flux from the external device enters into the opening provided at the metallic cover, and passes through the coil opening of the antenna coil along the magnetic sheet to outside from the end of the metallic cover to form magnetic field loop, so it is possible to secure higher communication performance.

At this time, in one embodiment of the present invention, the antenna coil and the magnetic sheet may be arranged not to overlap with the opening of the metallic cover.

In this way, it is possible to secure higher communication performance without structural restriction of the electronic apparatus.

In addition, in one embodiment of the present invention, the antenna coil may be in elongated rectangular shape provided by winding around the conducting wire such that conducting wires opposing in width direction via the coil opening will be close to each other.

In this way, by mounting the magnetic sheet and the antenna coil in elongated rectangular shape at back side of the metallic cover in the region between the opening and the end of the metallic cover, magnetic flux from the external device enters into the opening provided at the metallic cover, and passes through the coil opening of the antenna coil along the magnetic sheet to outside from the end of the metallic cover to form magnetic field loop, so it is possible to secure higher communication performance.

In addition, in one embodiment of the present invention, the magnetic sheet may be formed with an absent part at a position overlapped with the opening of the metallic cover.

In this way, it is possible to secure higher communication performance without structural restriction of the electronic apparatus while achieving weight reduction, as used amount of the magnetic sheet can be reduced.

In addition, in one embodiment of the present invention, the antenna coil may be provided to be wound around to bypass the absent part.

In this way, it is possible to secure higher communication performance without structural restriction of the electronic apparatus, as the antenna coil will be able to bypass the opening of the metallic cover while expanding an area of the antenna coil.

In addition, in one embodiment of the present invention, the absent part may be a recess formed to reduce an area of the magnetic sheet when planarly viewing the magnetic sheet.

In this way, it is possible to secure higher communication performance without structural restriction of the electronic apparatus while achieving weight reduction, as used amount of the magnetic sheet can be reduced according to an area of a part provided with the recess.

In addition, in one embodiment of the present invention, the antenna coil may be divided into two parts, i.e. one side part in which the conducting wire is wound around in one direction and other side part in which the conducting wire is wound around in other direction, via a center line longitudinally traversing the coil opening, and intervals of the conducting wire of the one side part may be identical with intervals of the conducting wire of the other side part.

In this way, it is possible to secure higher communication performance as it will be easier to introduce magnetic flux from the external device directly into the coil opening of the antenna coil.

In addition, in one embodiment of the present invention, the absent part may be an opening formed to reduce an area of the magnetic sheet when planarly viewing the magnetic sheet.

In this way, it is possible to secure higher communication performance without structural restriction of the electronic apparatus while achieving weight reduction, as used amount of the magnetic sheet can be reduced according to an area of a part provided with the opening.

In addition, in one embodiment of the present invention, the magnetic sheet may be arranged to overlap with the antenna coil mutually along the antenna coil by inserted into the coil opening such that the magnetic sheet is provided over both ends of the coil opening.

In this way, it is possible to secure higher communication performance, as it will be easier to introduce more magnetic flux from the external device directly into the coil opening of the antenna coil.

As explained in the above, according to the present invention, it is possible to secure higher communication performance without structural restriction of the electronic apparatus, by using magnetic shielding effect by the metallic cover.

DETAILED DESCRIPTION OF THE INVENTION

Hereinafter, explaining in detail about preferred embodiments of the present invention. In addition, the embodiments explained in below will not unjustly limit the content of the present invention described in claims, and it is not limited that all the structures explained in the embodiments are necessary as means for solving the problem of the present invention.

Figure 1:
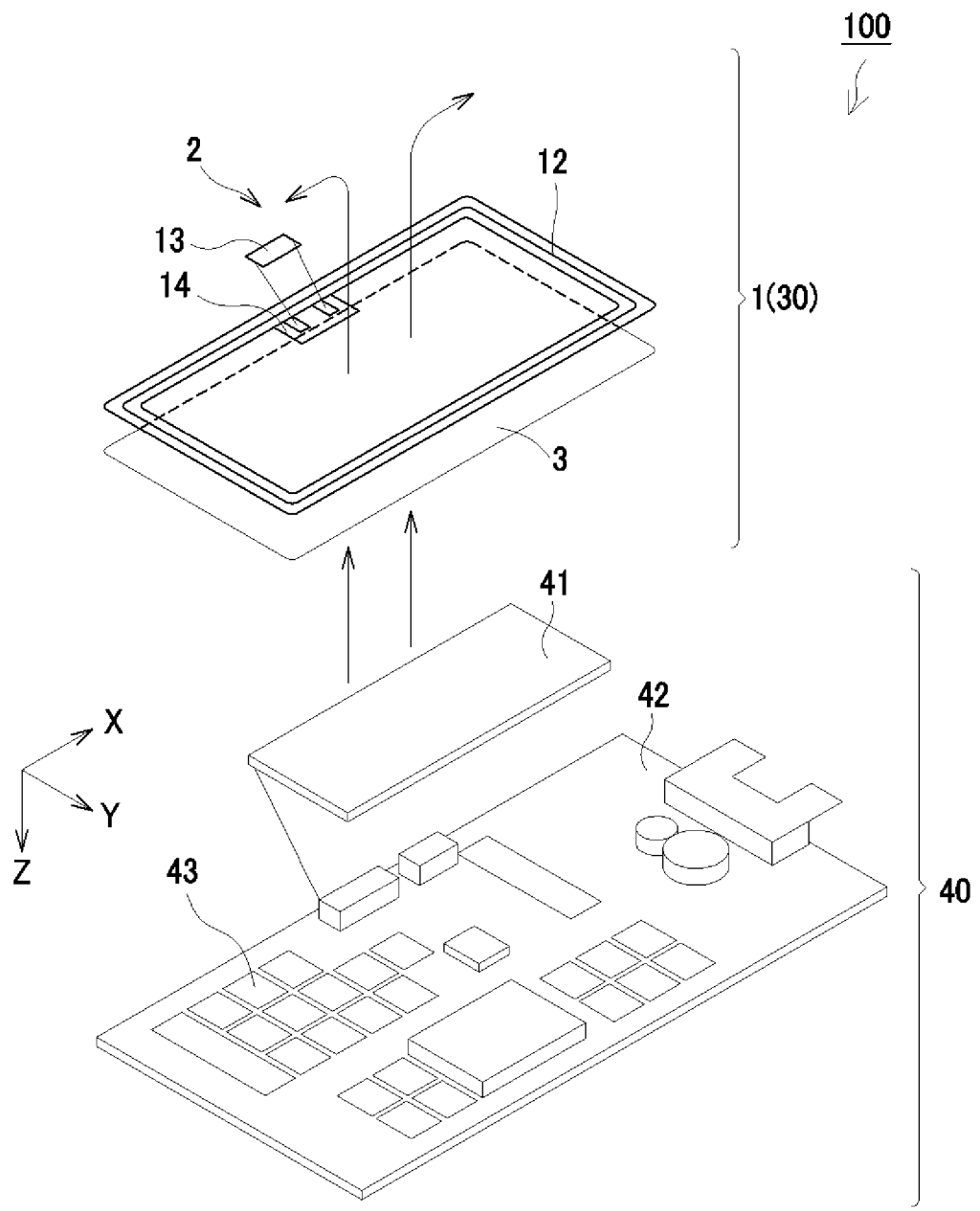
FIG. 1 is a perspective view illustrating a schematic structure of a wireless communication system applying an antenna device relating to one embodiment of the present invention.

At first, explaining about a structure of an antenna device relating to one embodiment of the present invention, using the drawings. FIG. 1 is a perspective view illustrating a schematic structure of a wireless communication system applying an antenna device relating to one embodiment of the present invention.

An antenna device 1 relating to this embodiment is a device incorporated in an electronic apparatus 30 and communicating with an external device via electromagnetic field signal, and for example, it is used by incorporated in a wireless communication system 100 for RFID as illustrated in FIG. 1.

As illustrated in FIG. 1, the wireless communication system 100 comprises: the antenna device 1 provided in the electronic apparatus 30; and a reader/writer 40 which is the external device for accessing to the antenna device 1. Here, the antenna device 1 and the reader/writer 40 are arranged to be opposed to each other in XY plane of three-dimensional orthogonal coordinate system XYZ illustrated in FIG. 1.

The reader/writer 40 functions as a transmitter for transmitting magnetic field in Z axis direction with respect to the antenna device 1 opposing to each other in XY plane, and concretely, the reader/writer 40 comprises: an antenna 41 for transmitting magnetic field to the antenna device 1; and a control board 42 for communicating with the antenna device 1 inductively coupled via the antenna 41.

In other words, in the reader/writer 40, the control board 42 electrically connected to the antenna 41 is arranged. In this control board 42, a control circuit 43 consisting of electronic components such as one or plurality of integrated circuit chips is mounted. This control circuit 43 performs various processing based on data received from the antenna device 1.

For example, when transmitting data to the antenna device 1, the control circuit 43 encodes data, modulates carrier wave of a predetermined frequency (for example, 13.56 MHz) based on encoded data, amplifies modulated modulation signal, and drives the antenna 41 by amplified modulation signal. In addition, when reading out data from the antenna device 1, the control circuit 43 amplifies modulation signal of data received by the antenna 41, demodulates amplified modulation signal of data, and decodes demodulated data.

In addition, in the control circuit 43, an encoding system and a modulating system used in general reader/writer are used, and for example, Manchester encoding system and ASK (Amplitude Shift Keying) modulating system are used. In addition, it is explained about the antenna device or the like in a contactless communication system in below, but same applies to a contactless charging system such as Qi.

For example, the antenna device 1 is incorporated inside of a housing of the electronic apparatus 30 such as portable telephone arranged to be opposed to the reader/writer 40 in XY plane. In this embodiment, the antenna device 1 comprises: an antenna module 2 having an antenna substrate 11 mounted with an antenna coil 12 capable of communicating with inductively coupled reader/writer 40; a communication processing unit 13 driven by current flowing in the antenna coil 12 for communicating with the reader/writer 40; and a metal plate 3.

The antenna module 2 is arranged inside of the housing of the electronic apparatus 30, and communicates with inductively coupled reader/writer 40. As illustrated in FIG. 1, in this embodiment, the antenna module 2 comprises: the antenna substrate 11, the communication processing unit 13 and a connection 14.

In the antenna substrate 11, for example, the antenna coil 12 formed by patterning processing a flexible conducting wire 12a (refer to FIG. 2A) such as a flexible flat cable, and a terminal area 14 for electrically connecting the antenna coil 12 and the communication processing unit 13, are mounted.

The antenna coil 12 will be magnetically coupled with the reader/writer 40 by inductive coupling when receiving magnetic field transmitted from the reader/writer 40, and the antenna coil 12 is having a function to receive modulated electromagnetic wave and to supply received signal to the communication processing unit 13 via the terminal area 14. In addition, about detailed explanation of configuration of the antenna coil 12, it will be described later.

The communication processing unit 13 is driven by current flowing in the antenna coil 12 and communicates with the reader/writer 40. Concretely, the communication processing unit 13 demodulates received modulation signal, decodes demodulated data, and writes decoded data into internal memory incorporated in the communication processing unit 13. In addition, the communication processing unit 13 reads out data to be transmitted to the reader/writer 40 from the internal memory, encodes read out data, modulates carrier wave based on encoded data, and transmits modulated electric wave to the reader/writer 40 via the antenna coil 12 magnetically coupled by inductive coupling. In addition, the communication processing unit 13 may be driven by electric power supplied from power supplying means such as external power source or battery pack incorporated in the electronic apparatus, instead of electric power flowing in the antenna coil 12.

The metal plate 3 is arranged inside of the housing of the electronic apparatus 30, and becomes a first conductor opposing to the reader/writer 40, which is the external device. The metal plate 3 is arranged inside of the housing of the electronic apparatus, for example a portable phone, a smart phone, a tablet PC or the like, and configures the first conductor opposing to the reader/writer 40 at the time of communication of the antenna module 2. For example, an internal structure such as a metallic cover attached to inner surface of a housing of smart phone, a metal housing of battery pack contained in smart phone, or a metal plate arranged at back surface of liquid crystal module of tablet PC corresponds to the first conductor.

The metal plate 3, which is the above internal structure, flows electricity relatively well, so eddy current occurs when AC magnetic field is applied from outside and magnetic field will be bounced back. By checking magnetic field distribution when such AC magnetic field is applied from outside, it is having a feature that magnetic field is strong at outer edge side of the metal plate 3 opposing to the reader/writer 40. Therefore, conventionally, the antenna coil 12 of the antenna module 2 was arranged at outer edge side of the metal plate 3 such as metal housing arranged in the housing of the portable phone 30, in order to secure excellent communication characteristics with the reader/writer 40, while miniaturizing the electronic apparatus 30 when incorporating the antenna module 2 in the electronic apparatus 30 such as the portable phone.

However, in the electronic apparatus or a portable terminal device such as so-called smart phone, there was a case that a surface of the housing is covered with conductive material such as metal cover, for a purpose of improving durability and designability. There was a problem that it is not possible to secure sufficient communication performance as electromagnetic wave for communication is absorbed by the metallic cover, even when the antenna module is mounted inside of the housing covered with such metallic cover. Therefore, an opening or a slit was newly provided at the metallic cover, in order to enable magnetic flux from the external device to pass through the metallic cover, but it occurred other problems such as decrease in strength of the metallic cover and restriction in design.

In addition, in multi-functionalized electronic apparatus having various functional elements such as camera and microphone, it is necessary to provide an opening or a slit at desired position of the metallic cover, in order to exert function of the various functional elements. Therefore, it is preferable to utilize the opening or the slit provided for various functional elements, in order to resolve the problems as decrease in strength of the metallic cover and restriction in design, by inhibiting decrease of communication performance caused by shielding the antenna module with the metallic cover. Especially, in the electronic apparatus such as the portable terminal device progressing its miniaturization and multi-functionalization, there are many requests for improving design freedom by avoiding its structural restriction such as to provide the opening for various functional elements at end side of the metallic cover, while securing excellent communication performance of the antenna.

As a result of keen examination for achieving the purpose of the present invention, the present inventors have found that it is possible to secure higher communication performance by providing the antenna coil to overlap with the metallic cover at least in a region between an opening and an end of the metallic cover at a backside surface of the metallic cover opposite to a surface of the metallic cover opposing to the external device. As a result of further research based on such knowledge, the present invention has been completed.

Figure 2A:
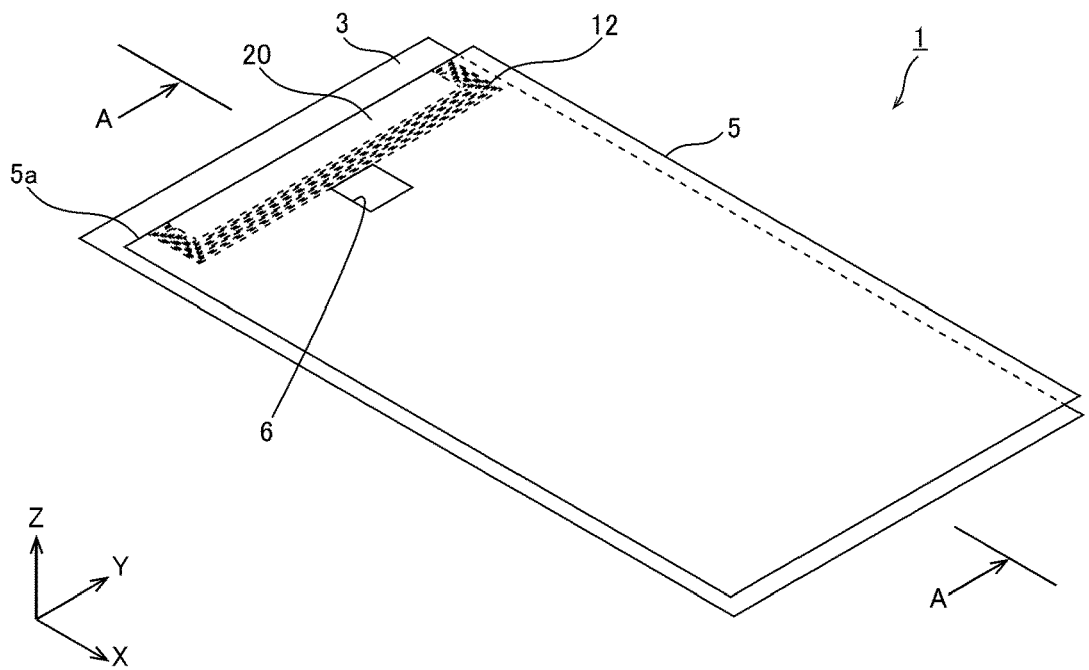
FIG. 2A is a perspective view illustrating an example of a schematic structure of an antenna device relating to first embodiment of the present invention.

Next, explaining about a configuration of an antenna device relating to first embodiment of the present invention, using drawings. FIG. 2A is a perspective view illustrating an example of a schematic structure of an antenna device relating to first embodiment of the present invention, FIG. 2B is a sectional view along line A-A of FIG. 2A, and FIG. 2C is a planar view illustrating an example of a principal part of a schematic structure of the antenna device relating to first embodiment of the present invention.

Figure 2B:
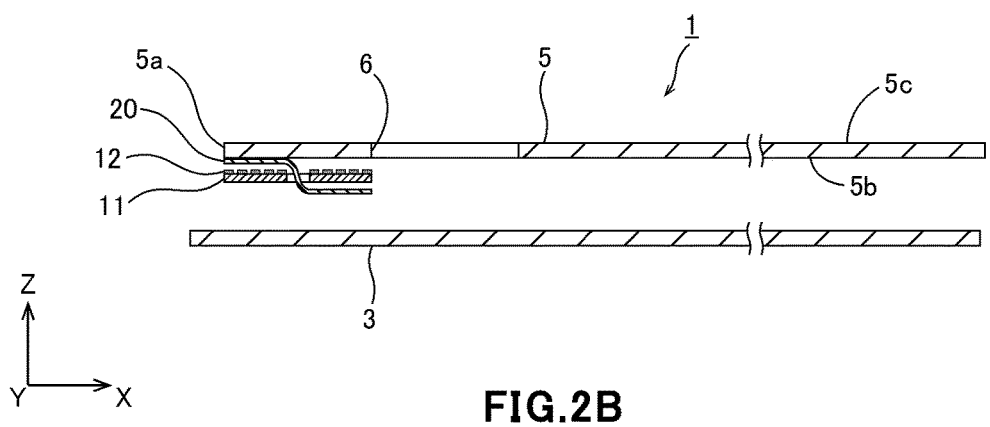
FIG. 2B is a sectional view along line A-A of FIG. 2A.
Figure 2C:
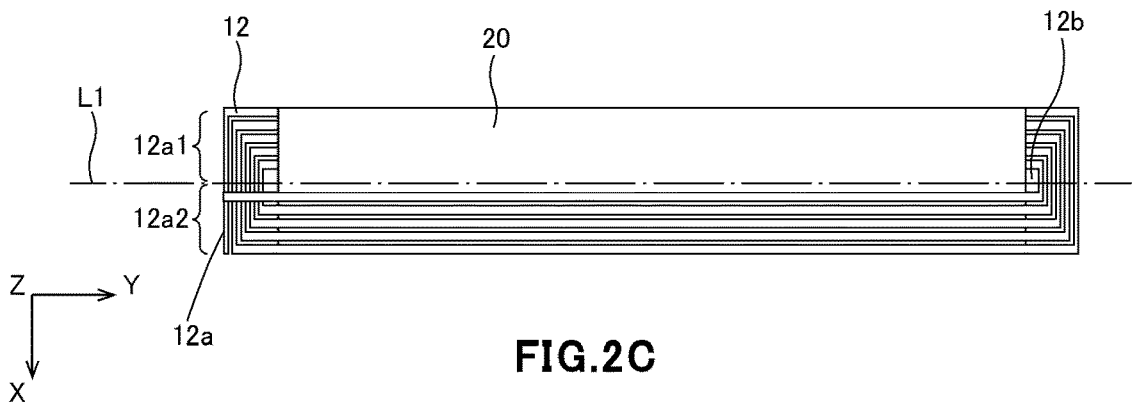
FIG. 2C is a planar view illustrating an example of a principal part of a schematic structure of the antenna device relating to first embodiment of the present invention.

As illustrated in FIGS. 2A to 2C, an antenna device 1 of this embodiment comprises: an antenna coil 12 in elongated rectangular shape and provided by winding around a conducting wire 12a in planar shape such that conducting wires 12a opposing in width direction (X direction) via a coil opening 12b will be close to each other; a magnetic sheet 20 arranged to be inserted into the coil opening 12b provided at center side of the antenna coil 12; and a metallic cover 5 in which an opening 6 for various functional elements such as camera is formed near its end 5a and arranged at surface side of the antenna coil 12 opposing to the external device 40 (refer to FIG. 1).

In this embodiment, the antenna coil 12 is an elongated approximately rectangular shaped coil divided into two parts, i.e. one side part 12a1 in which the conducting wire 12a is wound around in one direction and other side part 12a2 in which the conducting wire 12a is wound around in other direction, via a center line L1 longitudinally traversing the coil opening 12b at center side. In addition, the antenna coil 12 is arranged such that a main surface in which the conducting wire 12a is wound around will be opposed to a reader/writer 40 in XY plane illustrated in FIG. 1 at the time of communication. In addition, a size of length direction (Y direction) of the antenna coil 12 is approximately identical with a size of width direction (Y direction) of the metallic cover 5, in order to improve communication performance by configuring an area of the antenna coil 12 as large as possible.

In the coil opening 12b of the antenna coil 12, the magnetic sheet 20 formed from magnetic substance such as iron oxide, chrome oxide, cobalt or ferrite is inserted into the coil opening 12b provided at center side of the antenna coil 12 and arranged to overlap with the antenna coil 12 mutually along the antenna coil 12, in order to introduce magnetic flux from the external device directly into the coil opening 12b of the antenna coil 12 easily. By providing such magnetic sheet 20, current will not be induced to an edge of the opening 6 of the metallic cover 5 by current of the antenna coil 12.

In addition, in this embodiment, the magnetic sheet 20 is arranged to be inserted into the coil opening 12b such that, in the one side part 12a1 of the antenna coil 12, the magnetic sheet 20 is overlapped with the antenna coil 12 mutually from an end to the coil opening 12b of the antenna coil 12 at surface side of the antenna coil 12 opposing to the external device 40, and in the other side part 12*a*2 of the antenna coil 12, the magnetic sheet 20 is overlapped with the antenna coil 12 mutually from an end to the coil opening 12*b* of the antenna coil 12 at surface side of the antenna coil 12 opposite to a surface of the antenna coil 12 opposing to the external device 40. In this way, by arranging the magnetic sheet 20 to be inserted into the coil opening 12*b* such that the magnetic sheet 20 is overlapped with the antenna coil 12 over width direction (X direction) of the antenna coil 12, magnetic flux from the external device 40 entered into the opening 6 of the metallic cover 5 passes through the coil opening 12*b* of the antenna coil 12 along the magnetic sheet 20 to outside from end 5*a* side of the metallic cover 5 to form magnetic field loop.

In addition, in this embodiment, the magnetic sheet 20 is arranged to overlap with the antenna coil 12 mutually along the antenna coil 12 by inserted into the coil opening 12*b* such that the magnetic sheet 20 is provided over both ends of the coil opening 12*b*, in order to introduce more magnetic flux from the external device 40 directly into the coil opening 12*b* of the antenna coil 12 easily. In other words, the magnetic sheet 20 having a width to fulfill length direction (Y direction) of the coil opening 12*b* is inserted into the coil opening 12*b*.

Further, in this embodiment, as illustrated in FIG. 2B, the antenna coil 12 is characterized by arranging to overlap with the metallic cover 5 at least in a region between the opening 6 and the end 5*a* of the metallic cover 5 at a backside surface 5*b* of the metallic cover 5 opposite to a surface 5*c* of the metallic cover 5 opposing to the external device 40. In this way, in this embodiment, the antenna coil 12 in which the magnetic sheet 20 is inserted in the coil opening 12*b* is provided to overlap in a region between the opening 6 and the end 5*a* of the metallic cover 5 at the backside surface 5*b* of the metallic cover 5.

Therefore, magnetic flux from the external device 40 enters from the opening 6 for various functional elements provided at the metallic cover 5, and passes through the coil opening 12*b* of the antenna coil 12 along the magnetic sheet 20 to outside from the end 5*a* of the metallic cover 5 to form magnetic field loop, so it is possible to secure higher communication performance. In this way, by arranging the magnetic sheet 20 and the antenna coil 12 in elongated rectangular shape in a region between the opening 6 and the end 5*a* of the metallic cover 5 at back surface 5*b* side of the metallic cover 5, it is possible to achieve high performance NFC antenna module with little restriction in mounting, while securing strength of the metallic cover 5. In other words, when arranging elongated rectangular shaped NFC antenna in a region between the opening 6 and the end 5*a* of the metallic cover 5 at the back surface 5*b* of the metallic cover 5 provided with the opening 6 for various functional elements such as camera, there is no need for adding new opening or slit, so it is possible to achieve inexpensive metallic cover 5 with high strength.

In addition, in this embodiment, the antenna coil 12 of the antenna device 1 is in elongated rectangular shape in which conducting wires 12*a* opposing in width direction (X direction) via a coil opening 12*b* will be close to each other, but when the opening 6 of the metallic cover 5 is arranged near the end 5*a* of the metallic cover 5, it will be difficult to mount elongated rectangular antenna coil 12. In addition, when an area of the antenna coil 12 becomes smaller, an amount of magnetic flux from the external device passing through the coil opening 12*b* will be reduced, so communication performance of the antenna device 1 will be decreased.

As a result of keen examination for achieving the purpose of the present invention, the present inventors have found that it is possible to achieve high performance NFC antenna with little restriction in mounting, by configuring a shape of the antenna module to be a shape to avoid interference with the opening of the metallic cover. As a result of further research based on such knowledge, the present invention has been completed. Concretely, an absent part is formed in the magnetic sheet at a position overlapped with the opening of the metallic cover, and the antenna coil is configured to be wound around to bypass the absent part.

By configuring as the above, the magnetic sheet and the antenna coil composing the antenna module are arranged not to overlap with the opening of the metallic cover to achieve high performance NFC antenna module with little restriction in mounting. Hereinafter, explaining about the configuration of the antenna device relating to other embodiment of the present invention, in which a shape of the antenna module is configured to be a shape to avoid interference with the opening of the metallic cover, using the drawings.

Figure 3A:
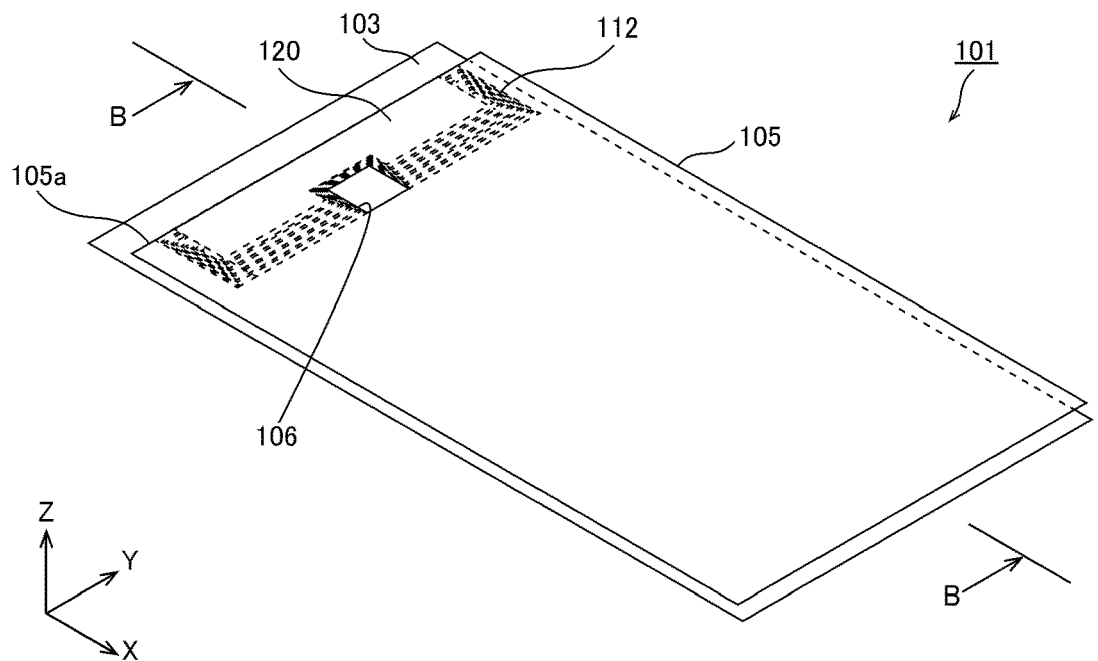
FIG. 3A is a perspective view illustrating an example of a schematic structure of an antenna device relating to second embodiment of the present invention.
Figure 3B:
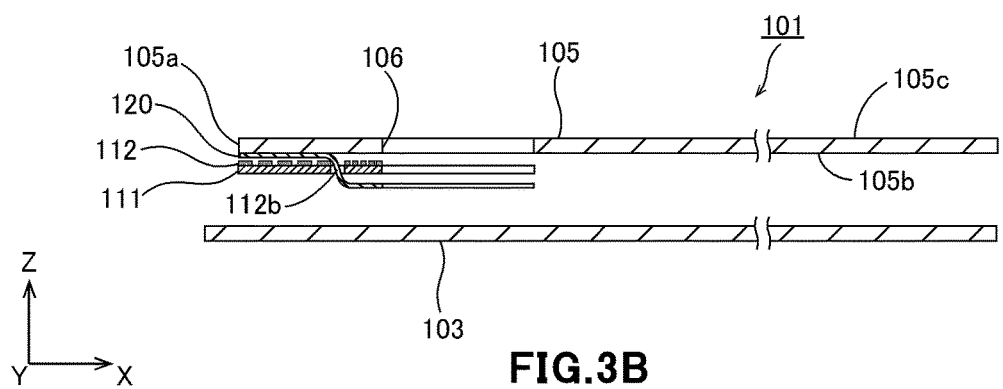
FIG. 3B is a sectional view along line B-B of FIG. 3A.
Figure 3C:
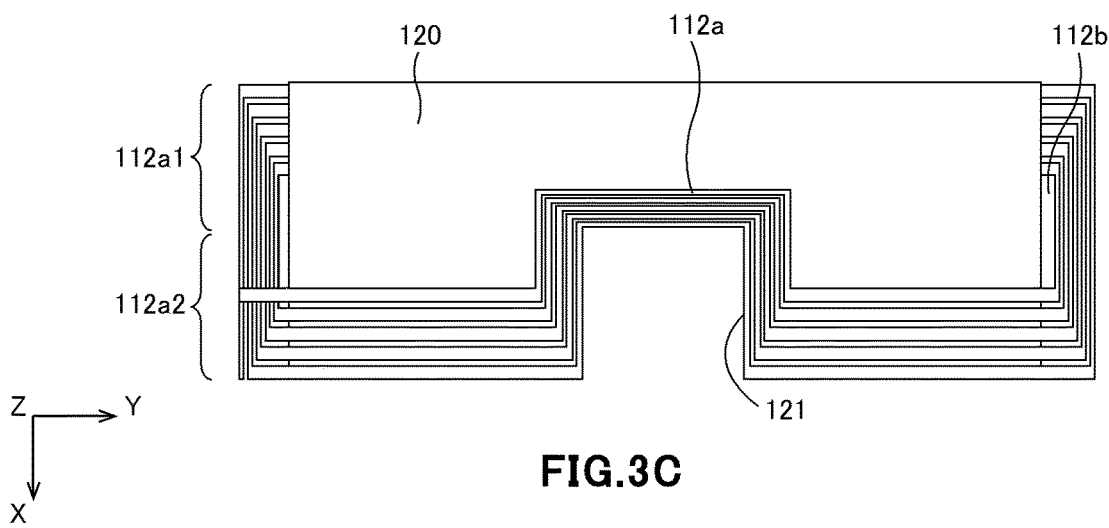
FIG. 3C is a planar view illustrating an example of a principal part of a schematic structure of the antenna device relating to second embodiment of the present invention.

FIG. 3A is a perspective view illustrating an example of a schematic structure of an antenna device relating to second embodiment of the present invention, FIG. 3B is a sectional view along line B-B of FIG. 3A, and FIG. 3C is a planar view illustrating an example of a principal part of a schematic structure of the antenna device relating to second embodiment of the present invention.

As illustrated in FIGS. 3A to 3C, an antenna device 101 of this embodiment comprises: an antenna coil 112 in approximately rectangular shape provided by winding around a conducting wire 112*a* in planar shape such that conducting wires 112*a* opposing in width direction (X direction) via a coil opening 112*b* will be close to each other; a magnetic sheet 120 arranged to be inserted into the coil opening 112*b* provided at center side of the antenna coil 112; and a metallic cover 105 arranged at surface side of the antenna coil 112 opposing to an external device 40 (refer to FIG. 1) and formed with an opening 106 for various functional elements such as camera near its end 105*a*.

As illustrated in FIGS. 3A to 3C, in this embodiment, it is characterized in that a recess 121 formed to reduce an area of the magnetic sheet 120 is provided in the magnetic sheet 120 as absent part at a position overlapped with the opening 106 of the metallic cover 105 when planarly viewing the magnetic sheet 120, and also, the antenna coil 112 is configured to be wound around to bypass the recess 121. By configuring the antenna device 101 as the above, the antenna coil 112 bypasses the opening 106 of the metallic cover 105 while expanding its area, so it is possible to secure higher communication performance without structural restriction of the electronic apparatus. In other words, in a slim type NFC antenna module mounted in a portable device and improving characteristics by using concentration of magnetic flux by magnetic shielding effect of a metal plate such as substrate, it will be possible to achieve excellent communication characteristics near a metal component, and also, to avoid interference with components inside the portable device, by providing the recess 121 at a part of an antenna.

In addition, it is necessary to use magnetic substance with high relative permeability such as iron oxide, chrome oxide, cobalt or ferrite as the magnetic sheet 120, in order to exert the performance efficiently near the metal component. As specific gravity of ferrite sheet mainly used in the NFC antenna module is about 5 g/cm$^3$, it is possible to reduce used amount of magnetic substance composing the magnetic sheet 120 by configuring as the antenna device 101 of this embodiment, so it will be possible to secure higher communication performance without structural restriction of the electronic apparatus while achieving weight reduction of the device. In addition, in an example illustrated in FIGS. 3A to 3C, a cutting line of the recess 121 is a straight line, but it may be a curved line as long as it is arranged not to overlap with the opening 106 of the metallic cover 105.

In this embodiment, the antenna coil 112 is an approximately rectangular shaped coil divided into two parts, i.e. one side part 112a1 in which the conducting wire 112a is wound around in one direction and other side part 112a2 in which the conducting wire 112a is wound around in other direction, via the coil opening 112b provided at center side. In addition, the antenna coil 112 is arranged such that a main surface in which the conducting wire 112a is wound around will be opposed to a reader/writer 40 in XY plane illustrated in FIG. 1 at the time of communication. In addition, a size in length direction (Y direction) of the antenna coil 112 is approximately identical with a size in width direction (Y direction) of the metallic cover 105, in order to improve communication performance by configuring an area of the antenna coil 112 as large as possible.

In the coil opening 112b of the antenna coil 112, the magnetic sheet 120 formed from magnetic substance is inserted into the coil opening 112b and arranged to overlap with the antenna coil 112 mutually along the antenna coil 112, in order to introduce magnetic flux from the external device directly into the coil opening 112b of the antenna coil 112 easily. By arranging the magnetic sheet 120 as the above, current will not be induced at an edge of the opening 106 of the metal cover 105 by current of the antenna coil 112.

In this embodiment, the magnetic sheet 120 is arranged to be inserted into the coil opening 112b such that, in the one side part 112a1 of the antenna coil 112, the magnetic sheet 120 is overlapped mutually with the antenna coil 112 from an end to the coil opening 112b of the antenna coil 112 at surface side of the antenna coil 112 opposing to the external device 40, and in the other side part 112a2 of the antenna coil 112, the magnetic sheet 120 is overlapped mutually with the antenna coil 112 from an end to the coil opening 112b of the antenna coil 112 at surface side of the antenna coil 112 opposite to a surface of the antenna coil 112 opposing to the external device 40. In this way, by arranging the magnetic sheet 120 to be inserted into the coil opening 112b such that the magnetic sheet 120 is overlapped with the antenna coil 112 over width direction (X direction) of the antenna coil 112, magnetic flux from the external device 40 entered into the opening 106 of the metallic cover 105 passes through the coil opening 112b of the antenna coil 112 along the magnetic sheet 120 to outside from end 105a side of the metallic cover 105 to form magnetic field loop.

In addition, in this embodiment, the magnetic sheet 120 is arranged to overlap with the antenna coil 112 mutually along the antenna coil 112 by inserted into the coil opening 112b such that the magnetic sheet 120 is provided over both ends of the coil opening 112b, in order to introduce more magnetic flux from the external device 40 directly into the coil opening 112b of the antenna coil 112 easily. In other words, the magnetic sheet 120 having a width to fulfill length direction (Y direction) of the coil opening 112b is inserted into the coil opening 112b.

Further, in this embodiment, as illustrated in FIG. 3B, the antenna coil 112 is characterized by arranging to overlap with the metallic cover 105 at least in a region between the opening 106 and the end 105a of the metallic cover 105 at a backside surface 105b of the metallic cover 105 opposite to a surface 105c of the metallic cover 105 opposing to the external device 40. Concretely, in this embodiment, the one side part 112a1 of the antenna coil 112 in which the magnetic sheet 120 is inserted into the coil opening 112b is provided to overlap in a region between the opening 106 and the end 105a of the metallic cover 105 at the backside surface 105b of the metallic cover 105.

In addition, the configuration of the antenna device 101 of this embodiment is not limited to examples illustrated in FIGS. 3A to 3C. In other words, as illustrated in FIGS. 4A to 4C and FIGS. 5A to 5C, it may be configured such that the magnetic sheet 220, 320 is arranged to be inserted into the coil opening 212b, 312b such that, in the one side part 212a1, 312a1 of the antenna coil 212, 312, the magnetic sheet 220, 320 is overlapped mutually with the antenna coil 212, 312 from an end to the coil opening 212b, 312b of the antenna coil 212, 312 at surface side of the antenna coil 212, 312 opposite to a surface of the antenna coil 212, 312 opposing to the external device 40, and in the other side part 212a2, 312a2 of the antenna coil 212, 312, the magnetic sheet 220, 320 is overlapped mutually with the antenna coil 212, 312 from an end to the coil opening 212b, 312b of the antenna coil 212, 312 at surface side of the antenna coil 212, 312 opposing to the external device 40.

In this way, by arranging the magnetic sheet 220, 320 to be inserted into the coil opening 212b, 312b such that the magnetic sheet 220, 320 is overlapped with the antenna coil 212, 312 over width direction (X direction) of the antenna coil 212, 312, magnetic flux from the external device 40 entered into the opening 106 (refer to FIG. 3A) of the metallic cover 105 (refer to FIG. 3A) passes through the coil opening 212b, 312b of the antenna coil 212, 312 along the magnetic sheet 220, 320 to outside from end 105a (refer to FIG. 3A) side of the metallic cover 105 to form magnetic field loop, so it is possible to secure higher communication performance without structural restriction of the electronic apparatus.

Figure 4A:
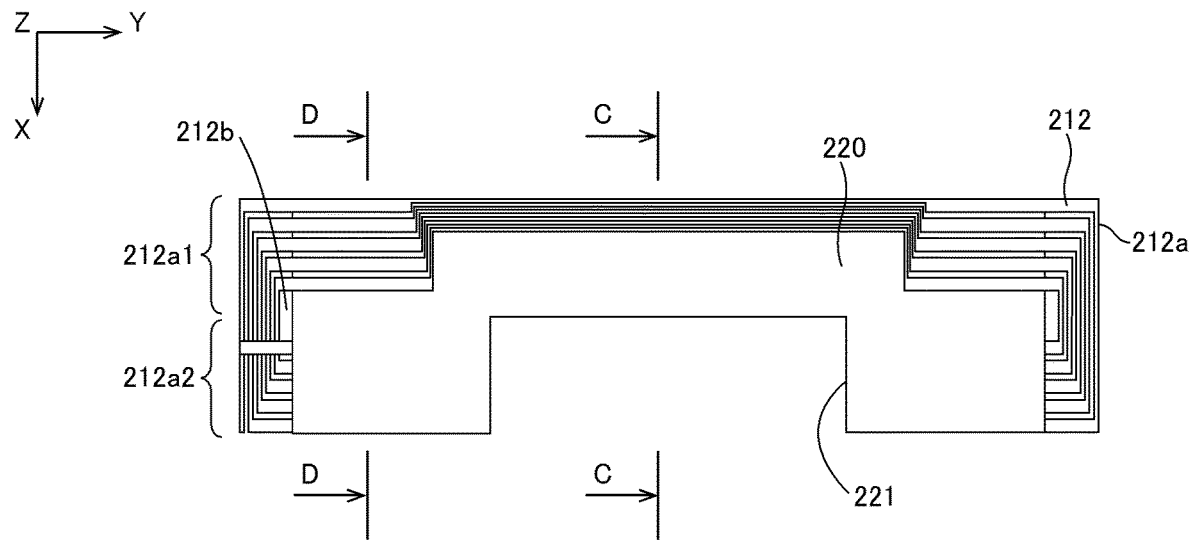
FIG. 4A is a planar view illustrating an example of a principal part of a schematic structure of a variant of an antenna device relating to second embodiment of the present invention.
Figure 4B:
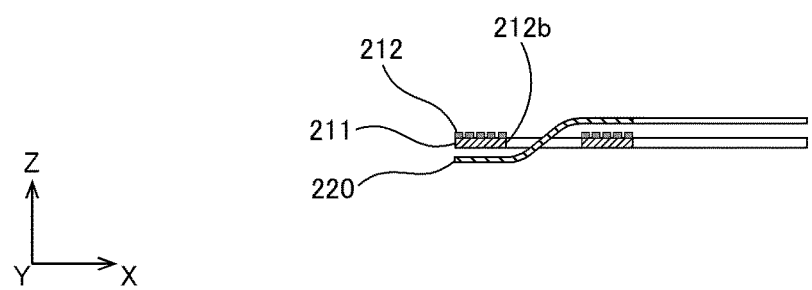
FIG. 4B is a sectional view along line C-C of FIG. 4A.
Figure 4C:
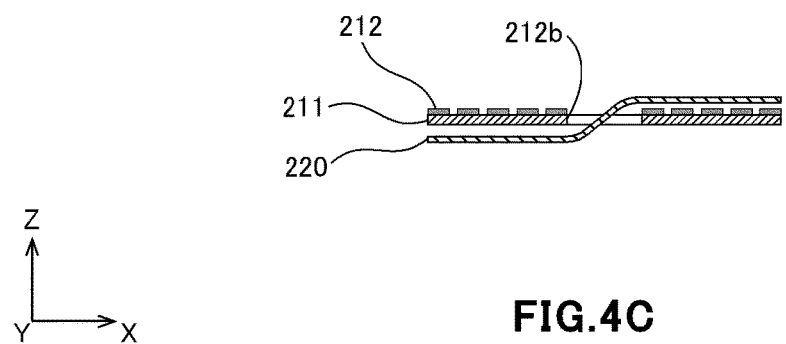
FIG. 4C is a sectional view along line D-D of FIG. 4A.
Figure 5A:
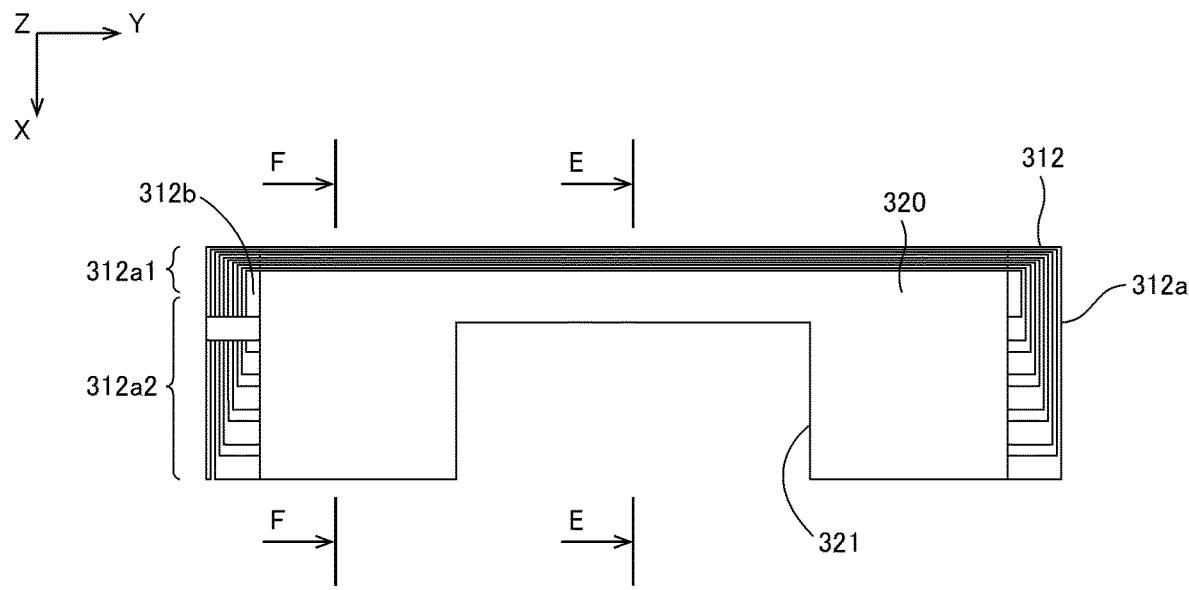
FIG. 5A is a planar view illustrating an example of a principal part of a schematic structure of other variant of an antenna device relating to second embodiment of the present invention.
Figure 5B:
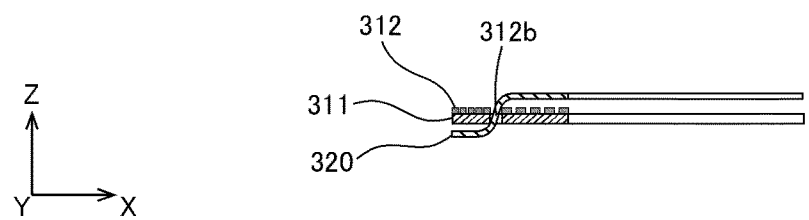
FIG. 5B is a sectional view along line E-E of FIG. 5A.
Figure 5C:
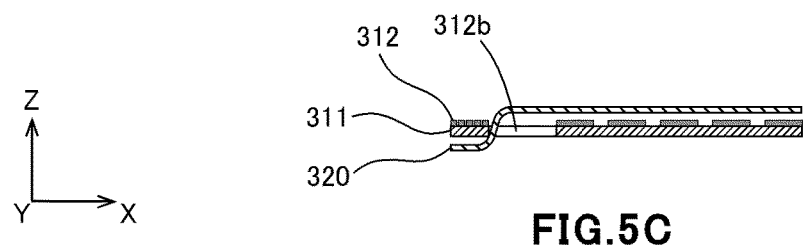
FIG. 5C is a sectional view along line F-F of FIG. 5A.

In addition, in a variant of this embodiment illustrated in FIG. 4A, intervals of conducting wires 212a in the one side part 212a1 is being identical with intervals of conducting wires 212a in the other side part 212a2, so it will be easy to introduce magnetic flux from the external device 40 directly into the coil opening 212b of the antenna coil 212, thus it is possible to secure higher communication performance than other variant of this embodiment illustrated in FIG. 5A.

Figure 6A:
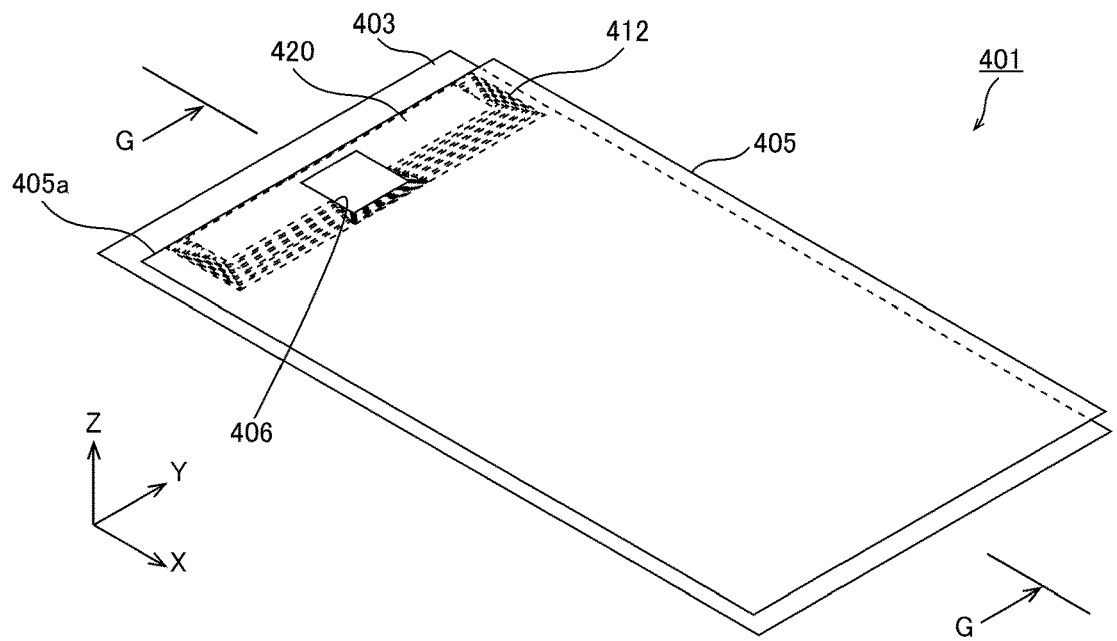
FIG. 6A is a perspective view illustrating an example of a schematic structure of an antenna device relating to third embodiment of the present invention.
Figure 6B:
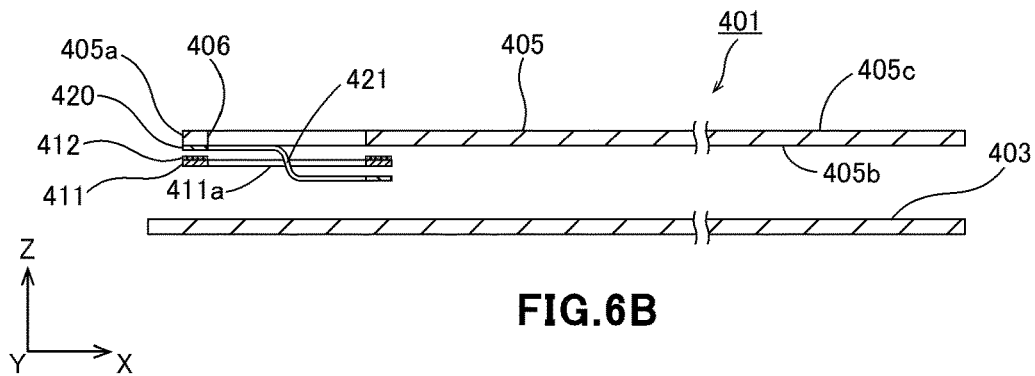
FIG. 6B is a sectional view along line G-G of FIG. 6A.
Figure 6C:
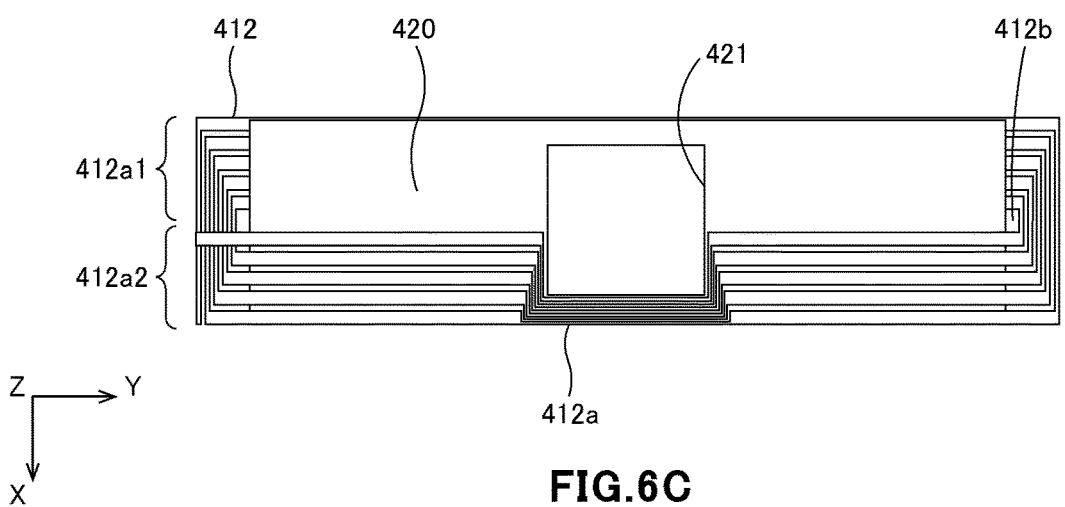
FIG. 6C is a planar view illustrating an example of a principal part of a schematic structure of the antenna device relating to third embodiment of the present invention.

FIG. 6A is a perspective view illustrating an example of a schematic structure of an antenna device relating to third embodiment of the present invention, FIG. 6B is a sectional view along line G-G of FIG. 6A, and FIG. 6C is a planar view illustrating an example of a principal part of a schematic structure of the antenna device relating to third embodiment of the present invention.

As illustrated in FIGS. 6A to 6C, an antenna device 401 of this embodiment comprises: an antenna coil 412 in approximately rectangular shape provided by winding around a conducting wire 412a in planar shape such that conducting wires 412a opposing in width direction (X direction) via a coil opening 412b will be close to each other; a magnetic sheet 420 arranged to be inserted into the coil opening 412b provided at center side of the antenna coil 412; and a metallic cover 405 arranged at surface side of the antenna coil 412 opposing to an external device 40 (refer to FIG. 1) and formed with an opening 406 for various functional elements such as camera near its end 405a.

As illustrated in FIGS. 6A to 6C, in this embodiment, it is characterized in that an opening 421 formed to reduce an area of the magnetic sheet 420 is provided in the magnetic sheet 420 as absent part at a position overlapped with the opening 406 of the metallic cover 405 when planarly viewing the magnetic sheet 420, and also, the antenna coil 412 is configured to be wound around to bypass the opening 421. By configuring the antenna device 401 as the above, the antenna coil 412 bypasses the opening 406 of the metallic cover 405 while expanding its area, so it is possible to secure higher communication performance without structural restriction of the electronic apparatus.

In addition, it is necessary to use magnetic substance with high relative permeability such as iron oxide, chrome oxide, cobalt or ferrite as the magnetic sheet 420, in order to exert the performance efficiently near a metal component. As specific gravity of ferrite sheet mainly used in NFC antenna module is about 5 g/cm$^3$, it is possible to reduce used amount of magnetic substance composing the magnetic sheet 420 by configuring as the antenna device 401 of this embodiment, so it will be possible to secure higher communication performance without structural restriction of the electronic apparatus while achieving weight reduction of the device. In addition, in an example illustrated in FIGS. 6A to 6C, a cutting line of the opening 421 is a straight line, but it may be a curved line as long as it is arranged not to overlap with the opening 406 of the metallic cover 405.

In this embodiment, the antenna coil 412 is an approximately rectangular shaped coil divided into two parts, i.e. one side part 412a1 in which the conducting wire 412a is wound around in one direction and other side part 412a2 in which the conducting wire 412a is wound around in other direction, via the coil opening 412b provided at center side. In addition, the antenna coil 412 is arranged such that a main surface in which the conducting wire 412a is wound around will be opposed to a reader/writer 40 in XY plane illustrated in FIG. 1 at the time of communication. In addition, a size in length direction (Y direction) of the antenna coil 412 is approximately identical with a size in width direction (Y direction) of the metallic cover 405, in order to improve communication performance by configuring an area of the antenna coil 412 as large as possible.

In the coil opening 412b of the antenna coil 412, the magnetic sheet 420 formed from magnetic substance is inserted into the coil opening 412b and arranged to overlap with the antenna coil 412 mutually along the antenna coil 412, in order to introduce magnetic flux from the external device directly into the coil opening 412b of the antenna coil 412 easily. By arranging the magnetic sheet 420 as the above, current will not be induced at an edge of the opening 406 of the metal cover 405 by current of the antenna coil 412.

In this embodiment, the magnetic sheet 420 is arranged to be inserted into the coil opening 412b such that, in the one side part 412a1 of the antenna coil 412, the magnetic sheet 420 is overlapped mutually with the antenna coil 412 from an end to the coil opening 412b of the antenna coil 412 at surface side of the antenna coil 412 opposing to the external device 40, and in the other side part 412a2 of the antenna coil 412, the magnetic sheet 420 is overlapped mutually with the antenna coil 412 from an end to the coil opening 412b of the antenna coil 412 at surface side of the antenna coil 412 opposite to a surface of the antenna coil 412 opposing to the external device 40. In this way, by arranging the magnetic sheet 420 to be inserted into the coil opening 412b such that the magnetic sheet 420 is overlapped with the antenna coil 412 over width direction (X direction) of the antenna coil 412, magnetic flux from the external device 40 entered into the opening 406 of the metallic cover 405 passes through the coil opening 412b of the antenna coil 412 along the magnetic sheet 420 to outside from end 405a side of the metallic cover 405 to form magnetic field loop.

In addition, in this embodiment, the magnetic sheet 420 is arranged to overlap with the antenna coil 412 mutually along the antenna coil 412 by inserted into the coil opening 412b such that the magnetic sheet 420 is provided over both ends of the coil opening 412b, in order to introduce more magnetic flux from the external device 40 directly into the coil opening 412b of the antenna coil 412 easily. In other words, the magnetic sheet 420 having a width to fulfill length direction (Y direction) of the coil opening 412b is inserted into the coil opening 412b.

Further, in this embodiment, as illustrated in FIG. 6B, the antenna coil 412 is characterized by arranging to overlap with the metallic cover 405 at least in a region between the opening 406 and the end 405a of the metallic cover 405 at a backside surface 405b of the metallic cover 405 opposite to a surface 405c of the metallic cover 405 opposing to the external device 40. Concretely, in this embodiment, a part of the one side part 412a1 of the antenna coil 412 in which the magnetic sheet 420 is inserted into the coil opening 412b is provided to overlap in a region between the opening 406 and the end 405a of the metallic cover 405 at the backside surface 405b of the metallic cover 405.

Figure 7A:
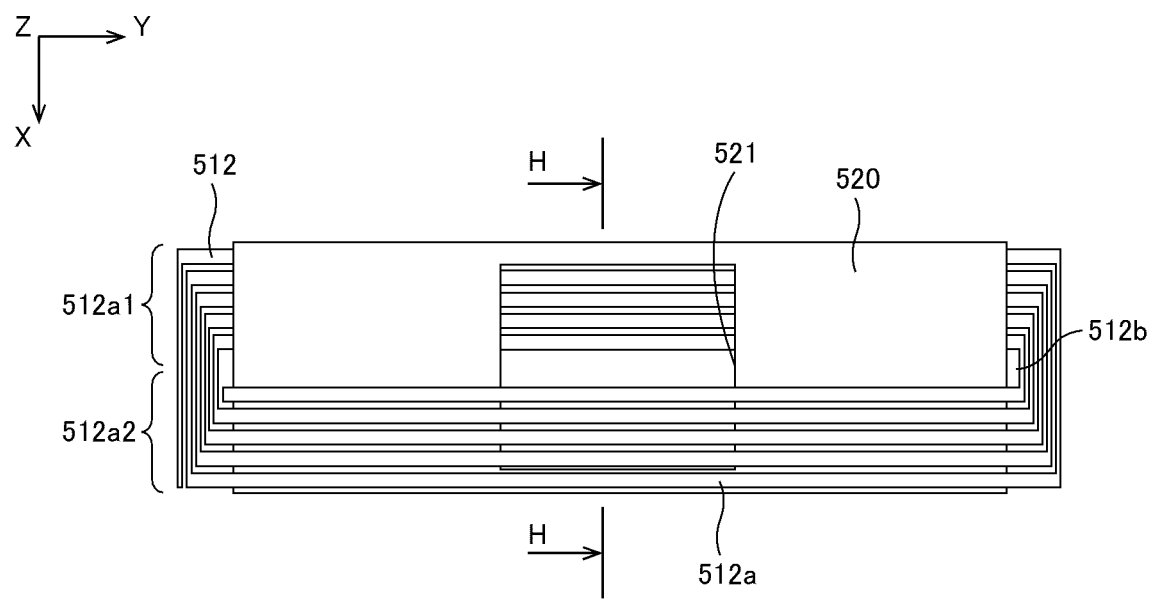
FIG. 7A is a planar view illustrating an example of a principal part of a schematic structure of a variant of an antenna device relating to third embodiment of the present invention.
Figure 7B:
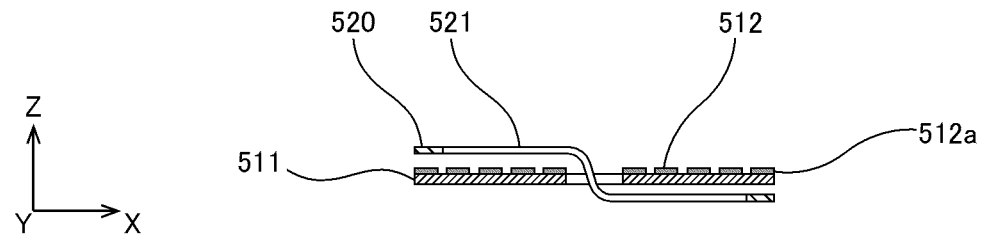
FIG. 7B is a sectional view along line H-H of FIG. 7A.

In addition, the configuration of the antenna device 401 of this embodiment is not limited to examples illustrated in FIGS. 6A to 6C. In other words, as illustrated in FIGS. 7A and 7B, it may be configured such that the opening 521 formed to reduce an area of the magnetic sheet 520 is provided in the magnetic sheet 520 as absent part at a position overlapped with the opening 406 (refer to FIG. 6A) of the metallic cover 405 (refer to FIG. 6A) when planarly viewing the magnetic sheet 520.

In other words, by configuring to provide the opening 521 only at the magnetic sheet 520, it is possible to reduce used amount of magnetic substance composing the magnetic sheet 520, so it is possible to secure higher communication performance while achieving weight reduction of the device. In addition, in an example illustrated in FIGS. 7A and 7B, a cutting line of the opening 521 is a straight line, but it may be a curved line as long as it is arranged not to overlap with the opening 406 of the metallic cover 405.

In addition, in second and third embodiment of the present invention, a part of the one side part 112a1, 412a1 of the antenna coil 112, 412 in which the magnetic sheet 120, 420 is inserted into the coil opening 112b, 412b is provided to overlap in a region between the opening 106, 406 and the end 105a, 405a of the metallic cover 105, 405 at the backside surface 105b, 405b of the metallic cover 105, 405, but even when the antenna coil 112, 412 and the magnetic sheet 120, 420 are not provided in the region, it is fine as long as the absent part 121, 421 formed to reduce an area of the magnetic sheet 120, 420 is provided in the magnetic sheet 120, 420 when planarly viewing the magnetic sheet 120, 420, and also, the antenna coil 112, 412 is configured to be wound around to bypass the absent part 121, 421. In other words, as long as the absent part 121, 421 is provided at the magnetic sheet 120, 420, and also, the antenna coil 112, 412 is configured to be wound around to bypass the absent part 121, 421, it is possible to avoid interference with other components inside the electronic apparatus while expanding an area of the antenna coil 112, 412, so it is possible to secure higher communication performance without structural restriction of the electronic apparatus.

EXAMPLES

Explaining about verification and evaluation of an antenna device relating to each embodiment of the present invention, using the drawings. An action and effect of the antenna device relating to each embodiment of the present invention was verified using the following examples and comparative examples. In addition, the present invention is not limited to these examples.

Explaining about a basic verification and evaluation for confirming an effect relating to a change of coupling coefficient with a reader/writer of the antenna device relating to each embodiment of the present invention, using the drawings.

Figure 8A:
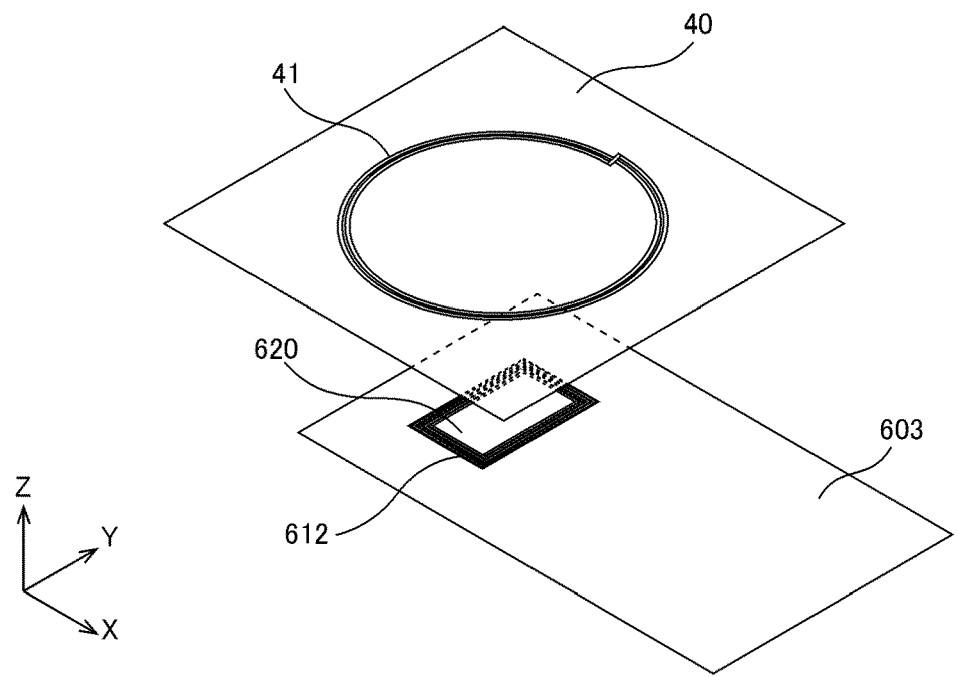
FIG. 8A is a perspective view illustrating an evaluation method for confirming action and effect of conventional antenna device as comparative example 1.
Figure 8B:
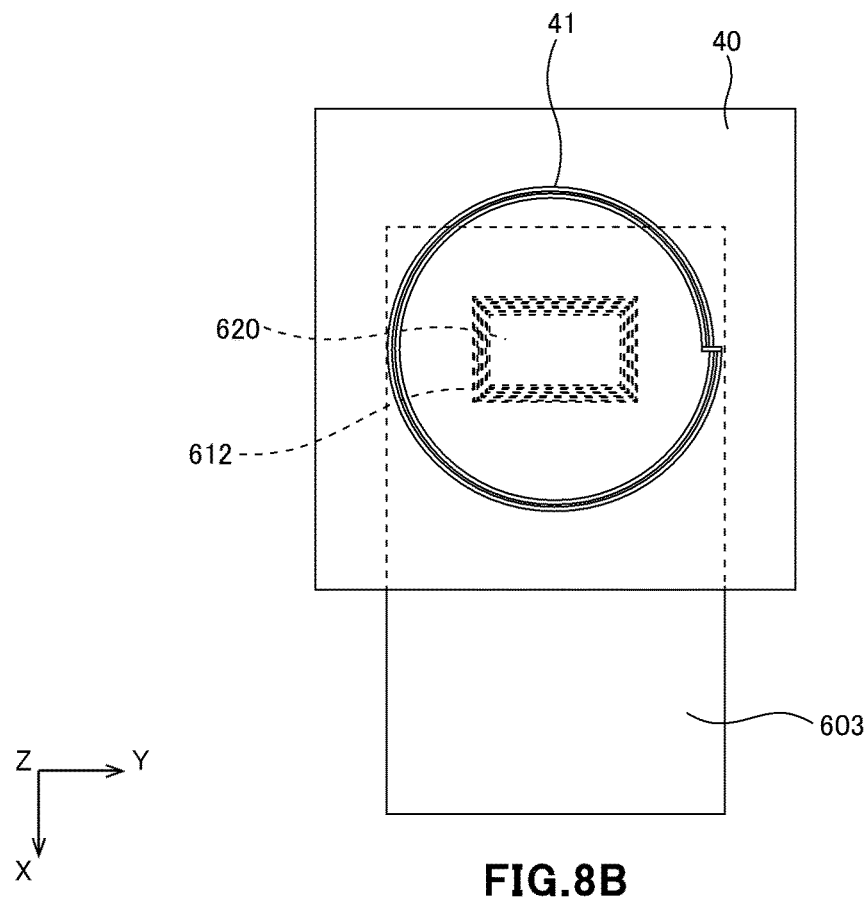
FIG. 8B is a planar view illustrating the evaluation method.
Figure 9A:
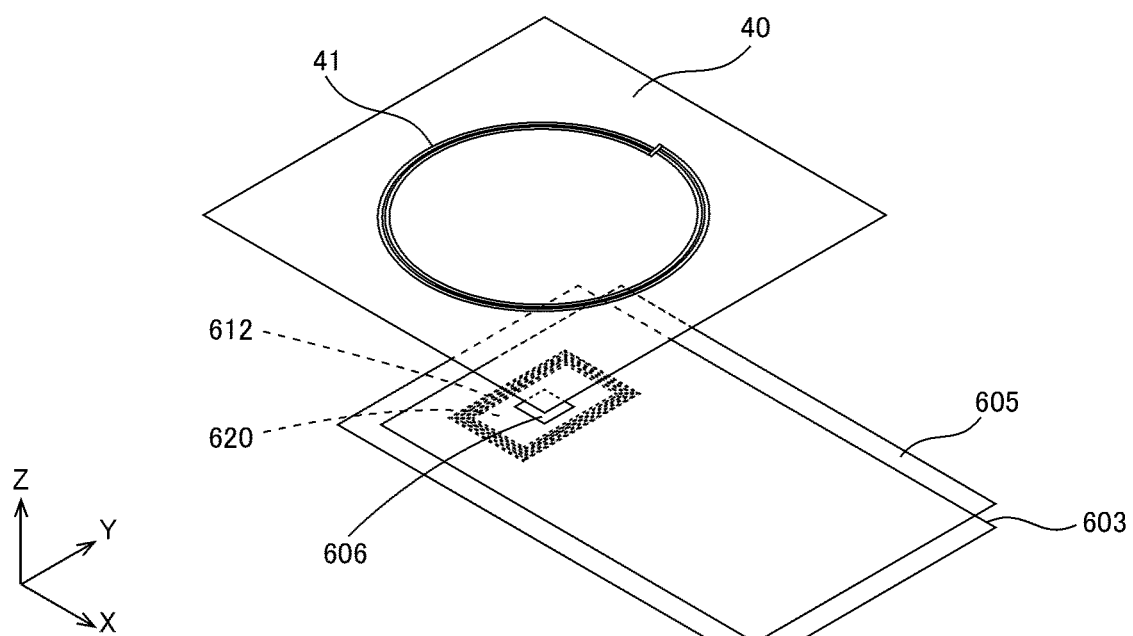
FIG. 9A is a perspective view illustrating an evaluation method for confirming action and effect of conventional antenna device as comparative example 2.
Figure 9B:
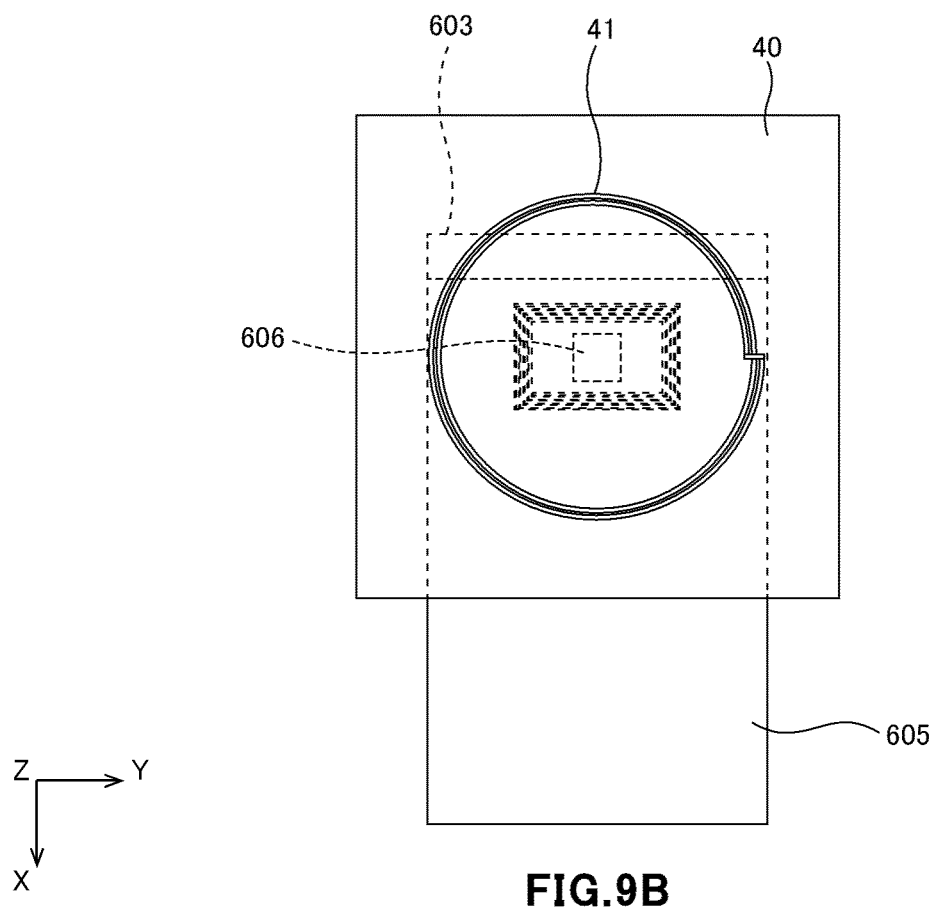
FIG. 9B is a planar view illustrating the evaluation method.
Figure 10A:
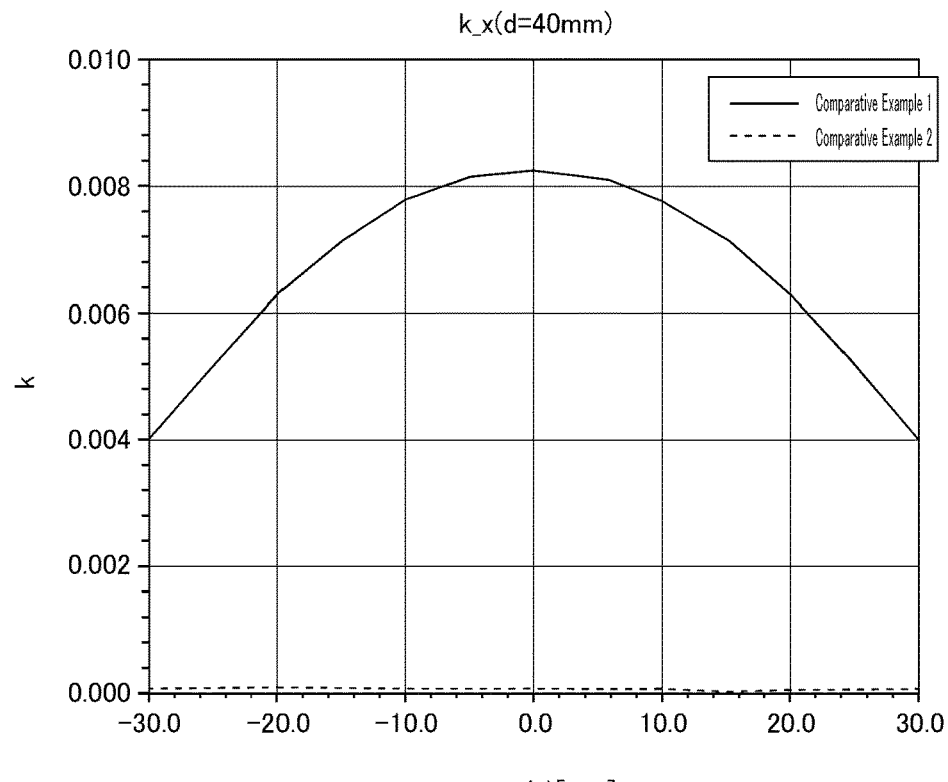
FIGS. 10A and 10B are graphs illustrating evaluation results of communication performance for confirming action and effect of the antenna device relating to comparative example 1 and comparative example 2.
Figure 10B:
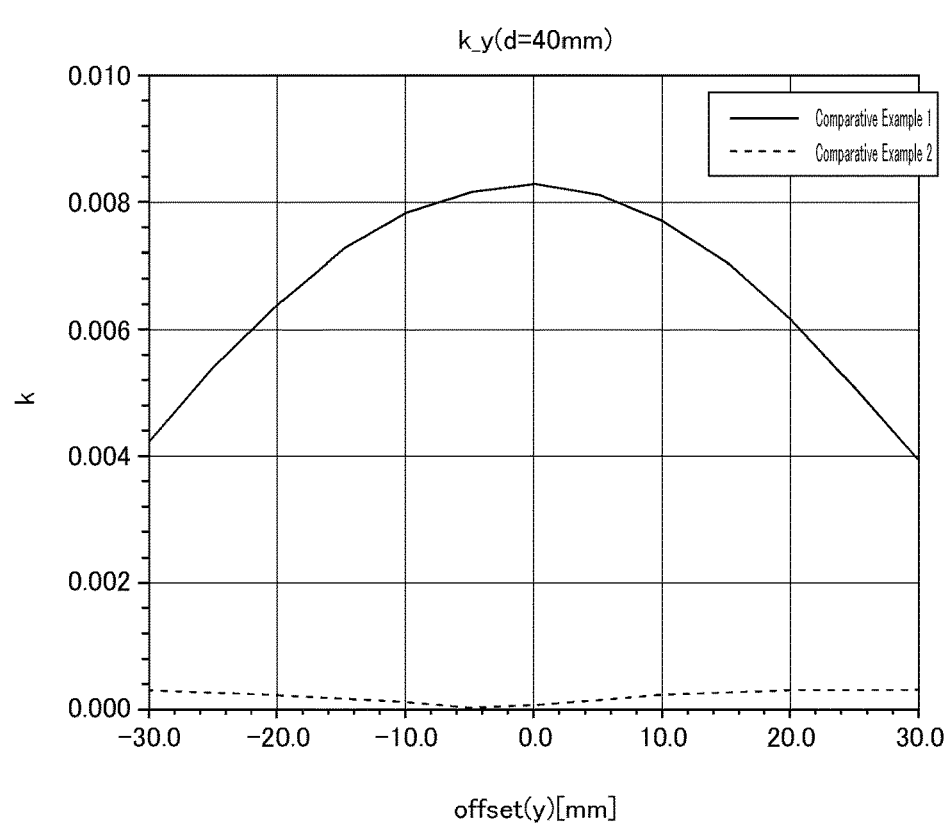

FIG. 8A is a perspective view illustrating an evaluation method for confirming action and effect of conventional antenna device as comparative example 1, and FIG. 8B is a planar view illustrating the evaluation method. FIG. 9A is a perspective view illustrating an evaluation method for confirming action and effect of conventional antenna device as comparative example 2, and FIG. 9B is a planar view illustrating the evaluation method. FIGS. 10A and 10B are graphs illustrating evaluation results of communication performance for confirming action and effect of the antenna device relating to comparative example 1 and comparative example 2.

At first, in comparative example 1 as prior art, as illustrated in FIGS. 8A and 8B, a coil 612 with a contour of 30 mm*20 mm formed by four turns of a conducting wire in a pitch of 1.0 mm was arranged at a position of 3.0 mm on a SUS plate 603 with a contour of 70 mm*150 mm and a thickness of 0.3 mm. And, the coil 612 and an antenna 40 having a circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the coil 612.

On the other hand, in comparative example 2 as prior art, as illustrated in FIGS. 9A and 9B, an aluminum plate 605 of 70 mm*135 mm with a thickness of 0.3 mm formed with an opening 606 of 7 mm*7 mm at end side was arranged on NFC antenna. In addition, an end of the opening 606 was at a position of 10 mm from the end of the aluminum plate 605. And, the coil 612 and the antenna 40 having the circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the coil 612.

From FIGS. 10A and 10B, which are graphs illustrating evaluation results of communication performance for confirming action and effect of the antenna device relating to comparative example 1 and comparative example 2, it was understood that, in comparative example 2 arranged with a cover of the aluminum plate 605, magnetic coupling became extremely low compared to comparative example 1, and it was not possible to obtain excellent communication characteristics. In other words, it was understood that it was necessary to secure communication performance by providing a slit from the end of the opening to the end of the aluminum plate, normally.

Next, in example 1 relating to an antenna device 1 (refer to FIG. 2A) of first embodiment of the present invention, a slim antenna 12 of 60 mm*10 mm with same antenna area as comparative examples 1 and 2 was arranged in 10 mm width between the opening 6 and the end 5a of the aluminum plate 5 at back side of the aluminum plate 5. And, the slim antenna 12 and the antenna 40 having the circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the slim antenna 12.

Figure 11A:
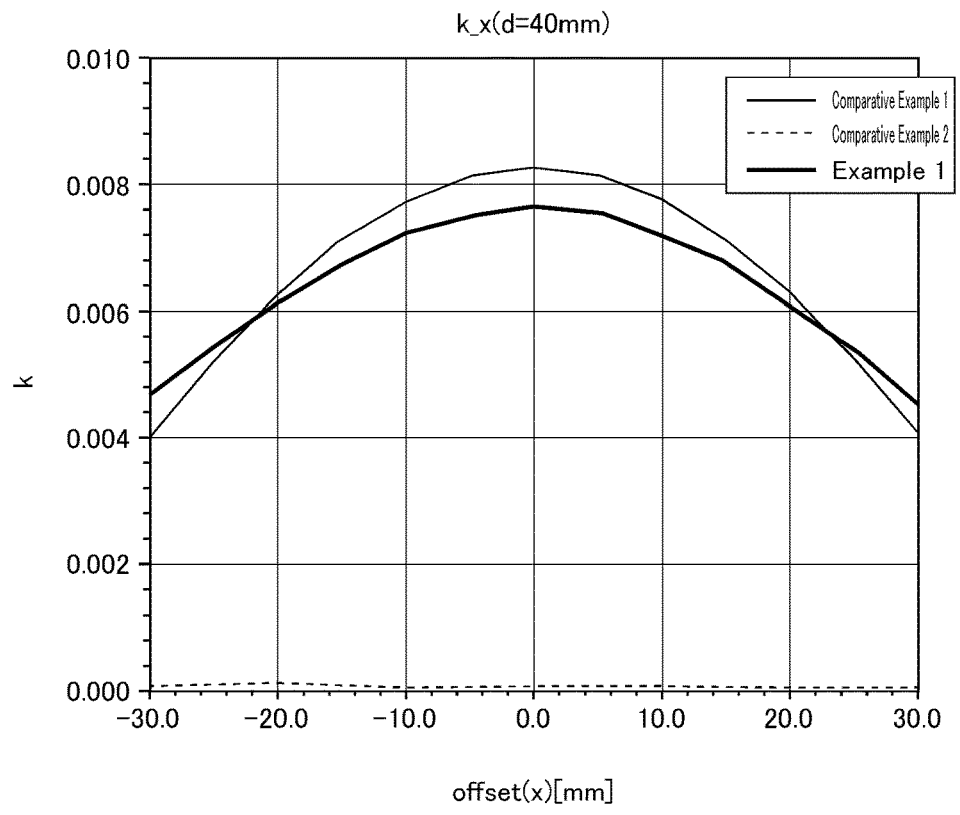
FIGS. 11A and 11B are graphs illustrating evaluation results of communication performance for confirming action and effect of the antenna device relating to example 1 of first embodiment of the present invention, and the antenna device relating to comparative example 1 and comparative example 2.
Figure 11B:
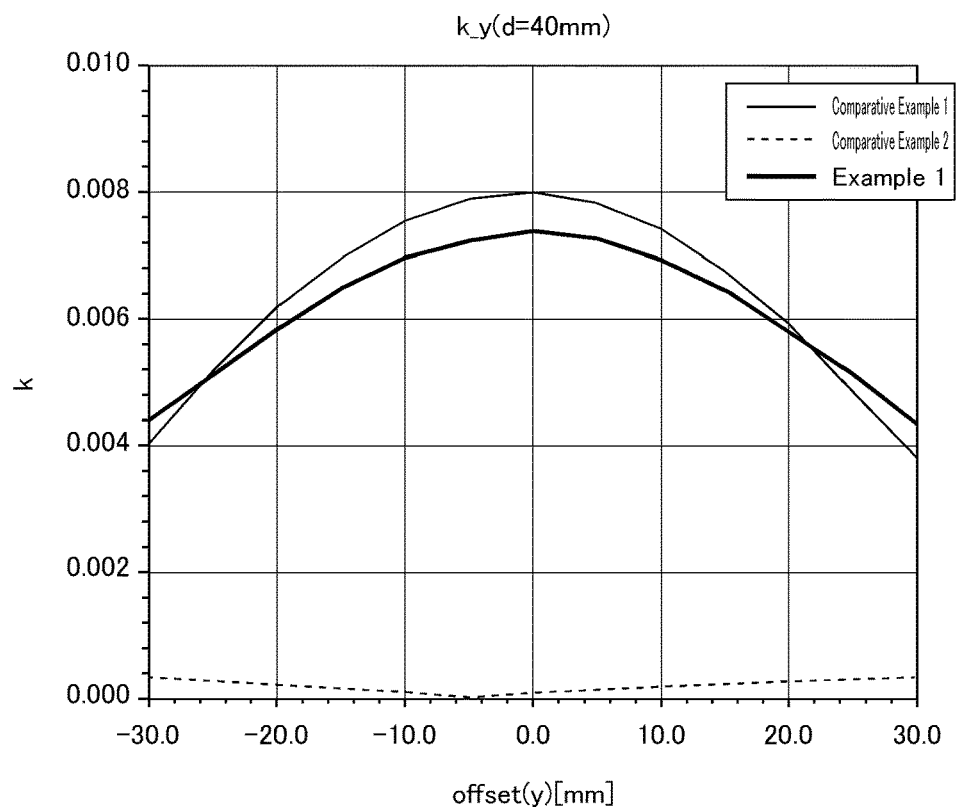

FIGS. 11A and 11B are graphs illustrating evaluation results of communication performance for confirming action and effect of the antenna device relating to example 1 of first embodiment of the present invention, and the antenna device relating to comparative example 1 and comparative example 2. As illustrated in FIGS. 11A and 11B, it was understood that, by arranging the slim antenna, even though it is having same area as the antenna of comparative examples, in 10 mm width between the opening 6 and the end 5a of the aluminum plate 5 at back side of the aluminum plate 5, the coupling coefficient k was increased significantly until a value near the value of comparative example 1, which was not shielded by the aluminum plate 5, even though the slim antenna was arranged at back side of the aluminum plate 5, which is a metallic cover. From the above, it was understood that, by arranging the slim antenna 12 in 10 mm width between the opening 6 and the end 5a of the aluminum plate 5 at back side of the aluminum plate 5, it is possible to secure excellent communication performance, even without providing a slit at the opening 6 of the aluminum plate 5.

Next, in example 2 relating to an antenna device 101 (refer to FIG. 3A) of second embodiment of the present invention, an antenna 112 of 30 mm*20 mm with same antenna area as comparative examples 1 and 2 was arranged in 10 mm width between the opening 106 and the end 105a of the aluminum plate 105 at back side of the aluminum plate 105. And, the antenna 112 and the antenna 40 having the circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the antenna 112.

In addition, in example 3 relating to an antenna device 401 (refer to FIG. 6A) of third embodiment of the present invention, an antenna 412 of 40 mm*15 mm with same antenna area as comparative examples 1 and 2 was arranged in 10 mm width between the opening 406 and the end 405a of the aluminum plate 405 at back side of the aluminum plate 405. And, the antenna 412 and the antenna 40 having the circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the antenna 412.

Figure 12A:
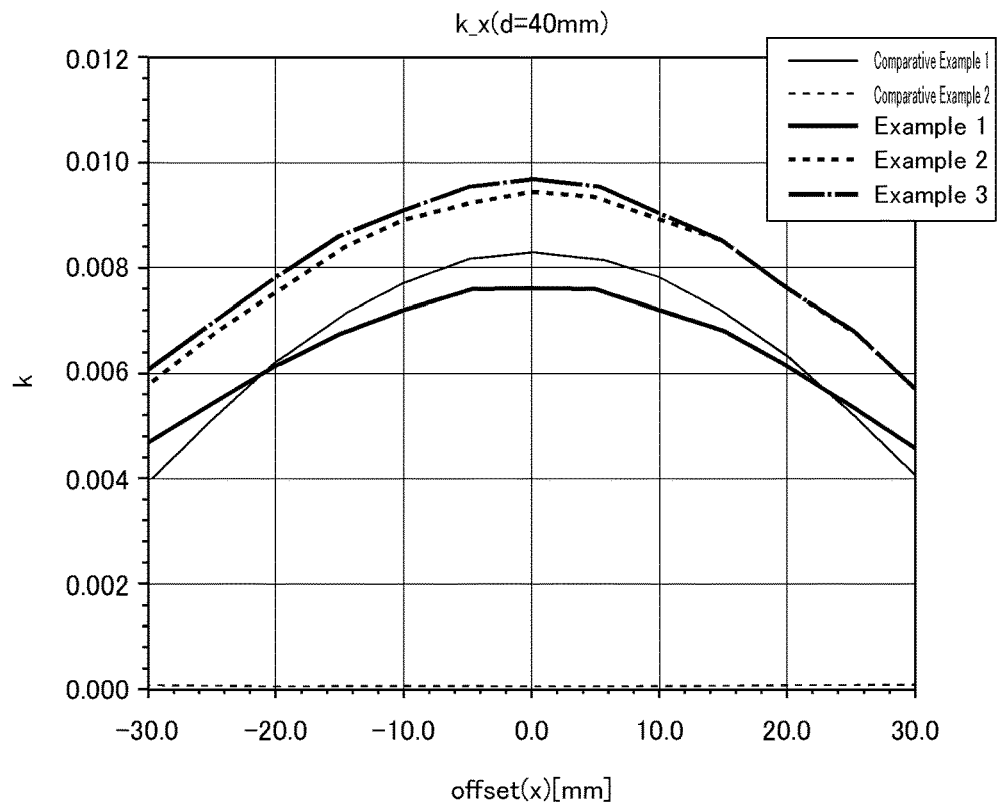
FIGS. 12A and 12B are graphs illustrating evaluation results of communication performance for confirming action and effect of the antenna device relating to example 1 of first embodiment of the present invention, the antenna device relating to example 2 of second embodiment of the present invention, the antenna device relating to example 3 of third embodiment of the present invention, and the antenna device relating to comparative example 1 and comparative example 2.
Figure 12B:
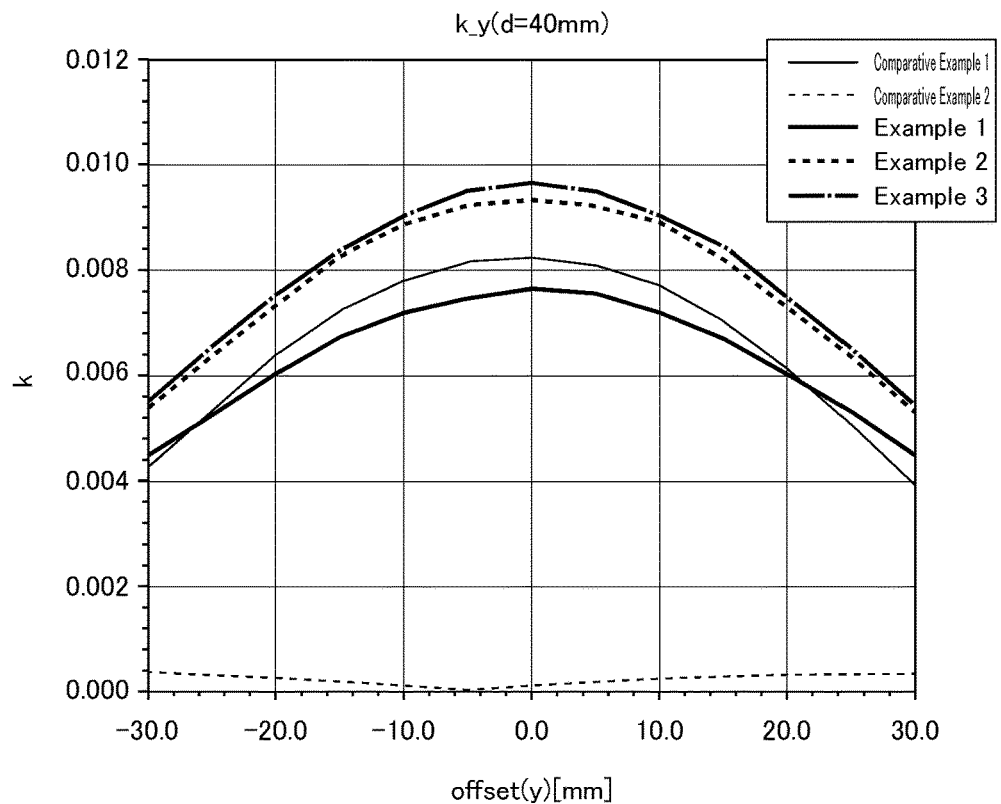

FIGS. 12A and 12B are graphs illustrating evaluation results of communication performance for confirming action and effect of the antenna device relating to example 1 of first embodiment of the present invention, the antenna device relating to example 2 of second embodiment of the present invention, the antenna device relating to example 3 of third embodiment of the present invention, and the antenna device relating to comparative example 1 and comparative example 2. As illustrated in FIGS. 12A and 12B, it was understood that, by providing an absent part such as the recess 121 or the opening 421 at the magnetic sheet 120, 420 of an antenna to avoid the opening 106, 406 of the aluminum plate 105, 405, the coupling coefficient k was increased significantly until a value more than the value of comparative example 1, which was not shielded by the aluminum plate 105, 405, even though the antenna was arranged at back side of the aluminum plate 105, 405, which is a metallic cover. From the above, it was understood that, by providing an absent part at the magnetic sheet 120, 420 of the antenna to avoid the opening 106, 406 of the aluminum plate 105, 405, it is possible to secure excellent communication performance, even without providing a slit at the opening 106, 406 of the aluminum plate 105, 405.

Next, when the opening of the aluminum plate was arranged near the end of the aluminum plate, it is difficult to mount an antenna without an opening, so a basic verification and evaluation for confirming an effect relating to change of coupling coefficient with a reader/writer of the antenna device was performed about a case when a distance between the end of the opening of the aluminum plate and the end of the aluminum plate was 5 mm.

In comparative example 1' as prior art, a coil with a contour of 30 mm*20 mm formed by four turns of a conducting wire in a pitch of 1.0 mm was arranged at a position of 3.0 mm on a SUS plate with a contour of 70 mm*150 mm and a thickness of 0.3 mm. And, the coil and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil.

On the other hand, in comparative example 2' as prior art, an aluminum plate of 70 mm*135 mm with a thickness of 0.3 mm formed with an opening of 7 mm*7 mm at end side was arranged on NFC antenna. In addition, an end of the opening was at a position of 5 mm from the end of the aluminum plate. And, the coil and the antenna having the circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil.

Next, in example 2' relating to an antenna device 101 (refer to FIG. 3A) of second embodiment of the present invention, an antenna 112 of 30 mm*20 mm with same antenna area as comparative examples 1 and 2 was arranged in 5 mm width between the opening 106 and the end 105a of the aluminum plate 105 at back side of the aluminum plate 105. And, the antenna 112 and the antenna 40 having the circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the antenna 112.

In addition, in example 3' relating to an antenna device 401 (refer to FIG. 6A) of third embodiment of the present invention, an antenna 412 of 50 mm*12 mm with same antenna area as comparative examples 1 and 2 was arranged in 5 mm width between the opening 406 and the end 405a of the aluminum plate 405 at back side of the aluminum plate 405. And, the antenna 412 and the antenna 40 having the circular coil 41 with a diameter of 70 mm formed by two turns of a conducting wire in a pitch of 1.5 mm were arranged in a distance of 40 mm, and distribution of magnetic coupling coefficient k was evaluated by moving the antenna 40 respectively in X direction and Y direction with respect to the antenna 412.

Figure 13A:
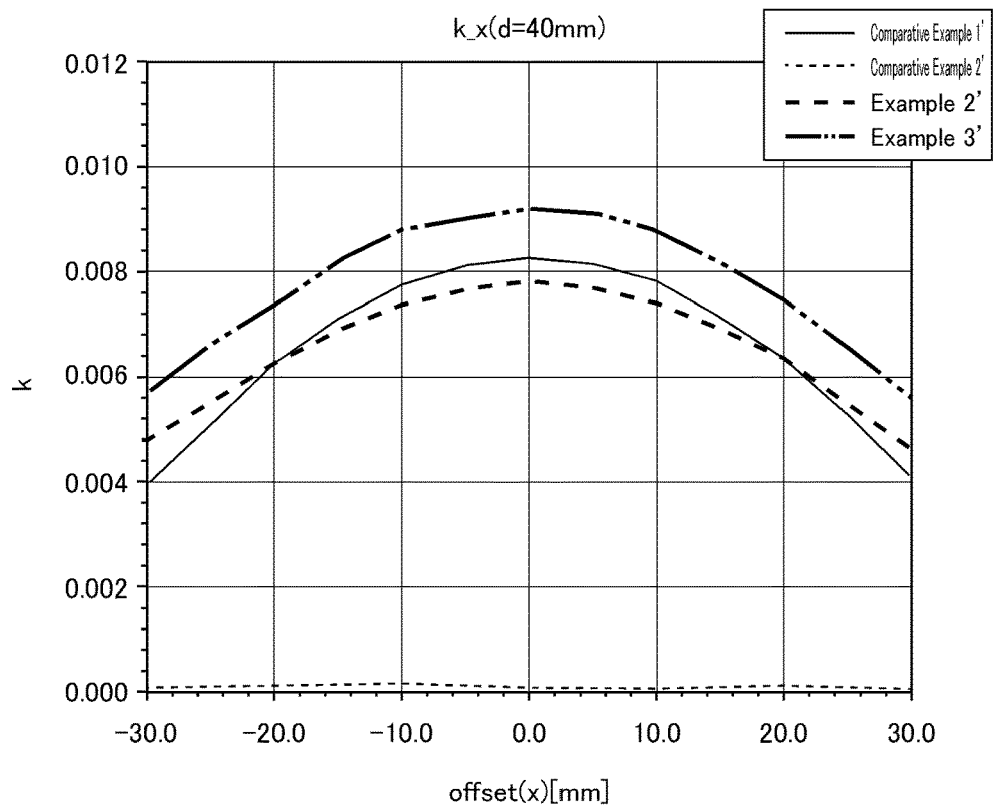
FIGS. 13A and 13B are graphs illustrating evaluation results of communication performance for confirming action and effect of the antenna device relating to example 2' of a variant of second embodiment of the present invention, the antenna device relating to example 3' of a variant of third embodiment of the present invention, and the antenna device relating to comparative example 1' and comparative example 2', which are variants of comparative example 1 and comparative example 2.
Figure 13B:
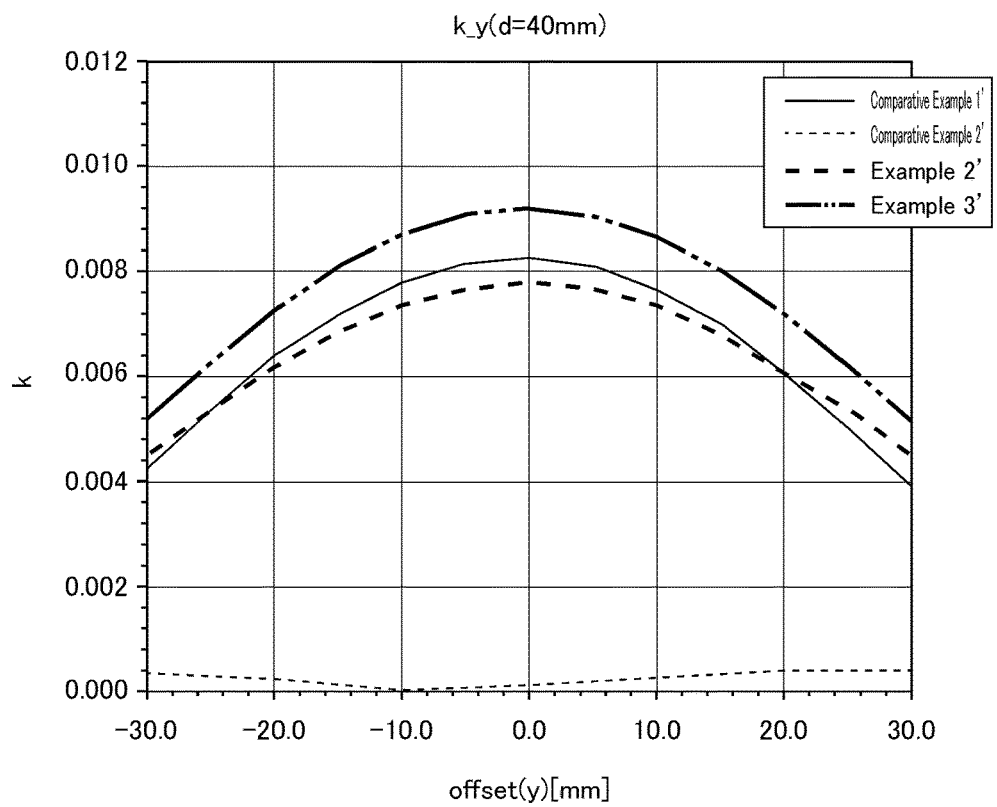

FIGS. 13A and 13B are graphs illustrating evaluation results of communication performance for confirming action and effect of the antenna device relating to example 2' of a variant of second embodiment of the present invention, the antenna device relating to example 3' of a variant of third embodiment of the present invention, and the antenna device relating to comparative example 1' and comparative example 2', which are variants of comparative example 1 and comparative example 2. As illustrated in FIGS. 13A and 13B, it was understood that it is possible to obtain excellent communication characteristics by arranging the absent part such as the recess or the opening at the antenna, when the opening of the aluminum plate is arranged near the end of the aluminum plate.

Next, explaining about a basic verification and evaluation for confirming an effect relating to a change of coupling coefficient with a reader/writer of the antenna device relating to second embodiment of the present invention, using the drawings.

Figure 14A:
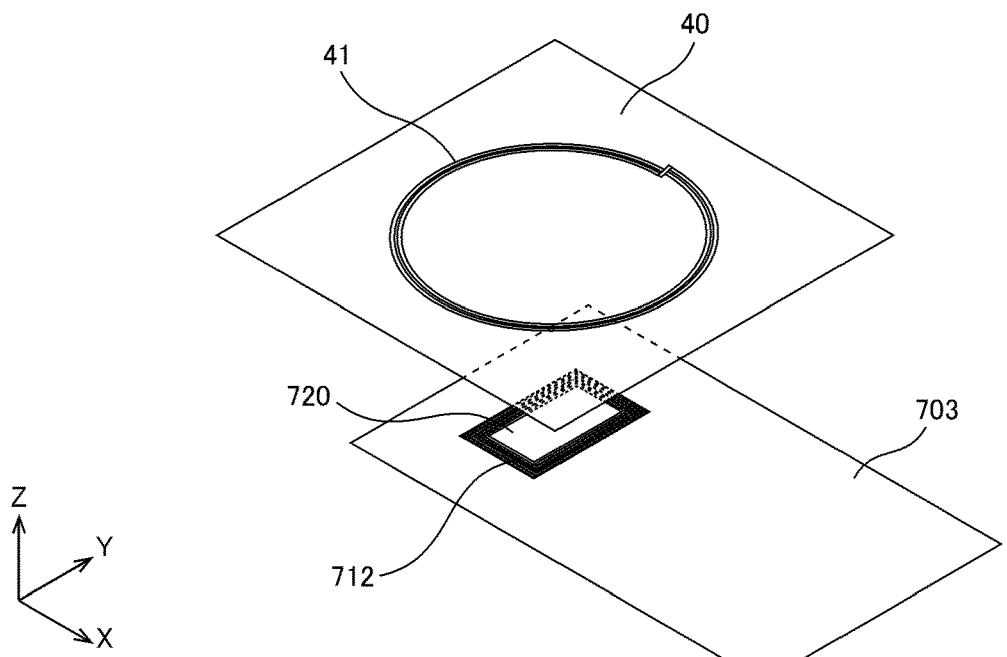
FIG. 14A is a perspective view illustrating an evaluation method for confirming action and effect of conventional antenna device as comparative example 3.
Figure 14B:
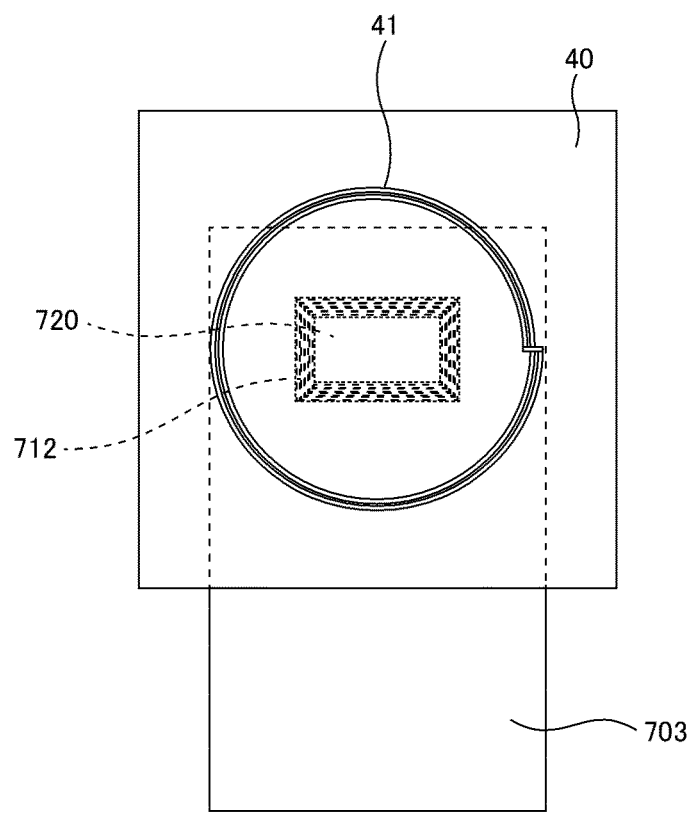
FIG. 14B is a planar view illustrating the evaluation method.
Figure 15A:
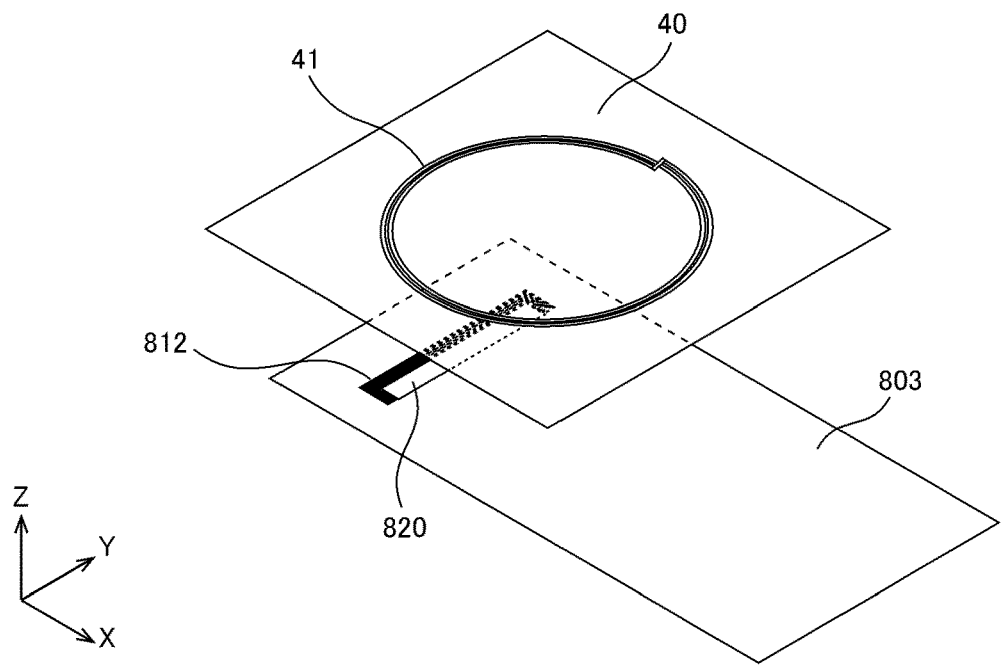
FIG. 15A is a perspective view illustrating an evaluation method for confirming action and effect of conventional antenna device as comparative example 4.
Figure 15B:
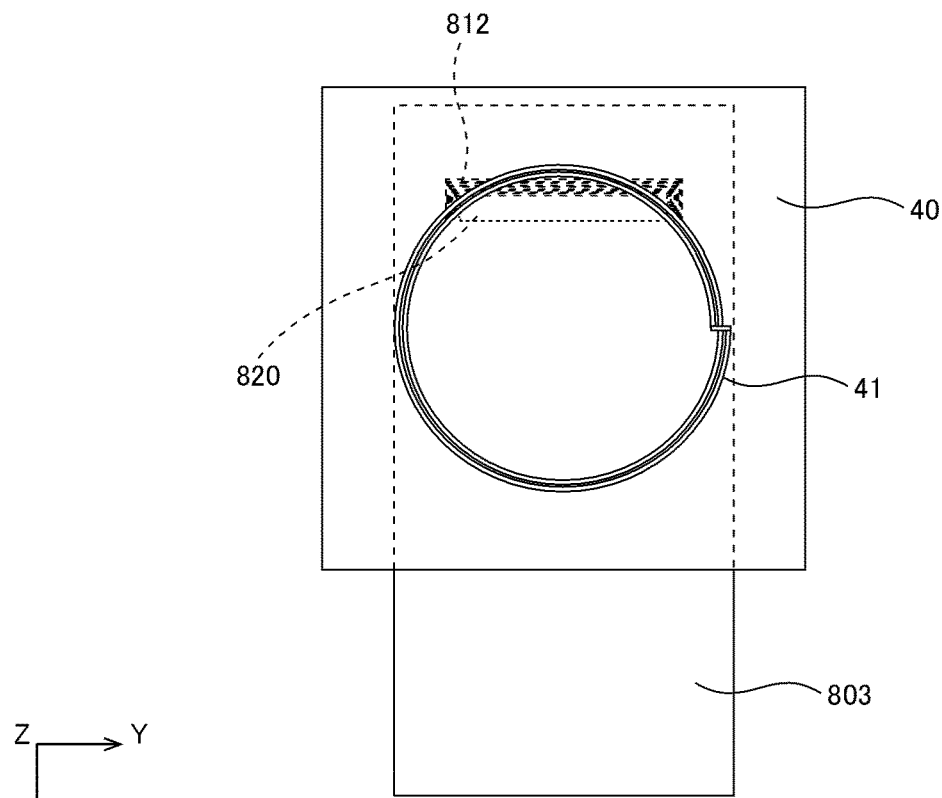
FIG. 15B is a planar view illustrating the evaluation method.
Figure 16A:
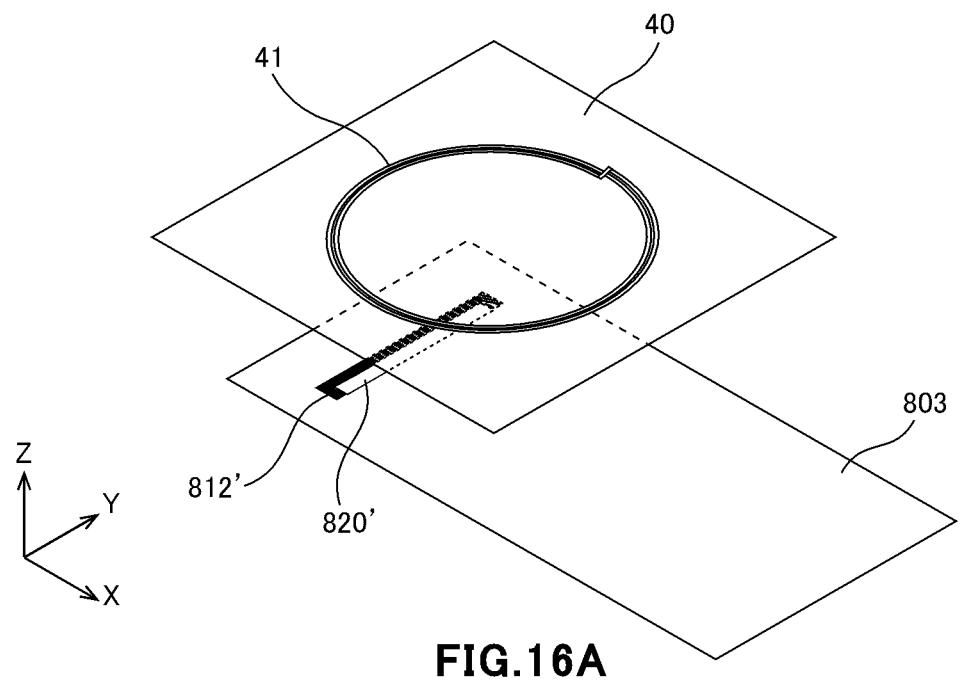
FIG. 16A is a perspective view illustrating an evaluation method for confirming action and effect of conventional antenna device as comparative example 4' which is a variant of comparative example 4.
Figure 16B:
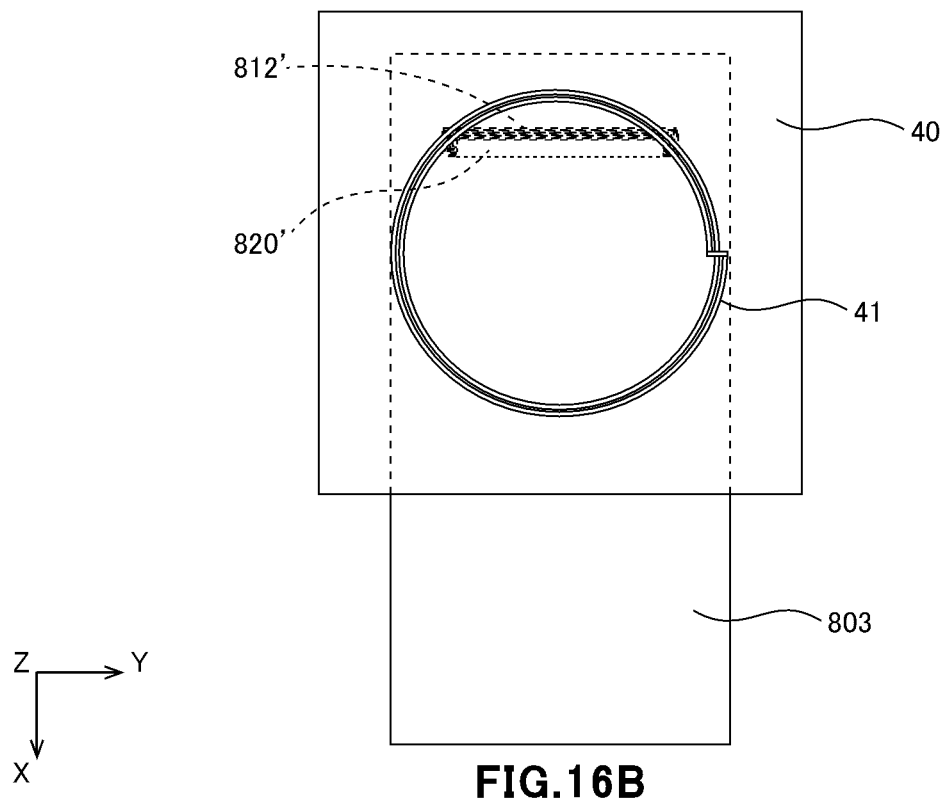
FIG. 16B is a planar view illustrating the evaluation method.

FIG. 14A is a perspective view illustrating an evaluation method for confirming action and effect of conventional antenna device as comparative example 3, and FIG. 14B is a planar view illustrating the evaluation method. FIG. 15A is a perspective view illustrating an evaluation method for confirming action and effect of conventional antenna device as comparative example 4, and FIG. 15B is a planar view illustrating the evaluation method. FIG. 16A is a perspective view illustrating an evaluation method for confirming action and effect of conventional antenna device as comparative example 4' which is a variant of comparative example 4, and FIG. 16B is a planar view illustrating the evaluation method.

Magnetic coupling coefficient between antennas when NFC antenna was arranged near an end (10 mm from the end) of a metallic plate (SUS plate of 70 mm*150 mm*0.3 mm), and when a circular antenna (double wound coil with a diameter of 70 mm) opposing to the NFC antenna was moved, was calculated by simulation. A distance between the NFC antenna and the circular antenna opposing to the NFC antenna was 40 mm.

In comparative example 3 as prior art, as illustrated in FIGS. 14A and 14B, NFC antenna was a quadruple wound coil with a contour of 30 mm*20 mm, and at a back surface of an antenna coil 712, a ferrite sheet 720 with a thickness of 0.1 mm was applied. And, the coil and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil.

In comparative example 4 as prior art, as illustrated in FIGS. 15A and 15B, NFC antenna was a slim type antenna in which a ferrite sheet 820 was inserted into an opening at a center of a quintuple wound coil 812 of 50 mm*12 mm. And, the coil and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil.

In comparative example 4' as prior art, as illustrated in FIGS. 16A and 16B, NFC antenna 812' was a slim type antenna in which a ferrite sheet 820' was inserted into an opening at a center of a quintuple wound coil of 50 mm*5 mm. And, the coil and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil.

On the other hand, NFC antenna 101 of example 4 relating to second embodiment of the present invention was a slim type antenna in which a ferrite sheet 120 was inserted into an opening 112*b* at a center of a quintuple wound coil 112 of 50 mm*12 mm, and a recess 121 of 20 mm*7 mm was provided at a position interfering with components. And, the coil 112 and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil 112.

Figure 17A:
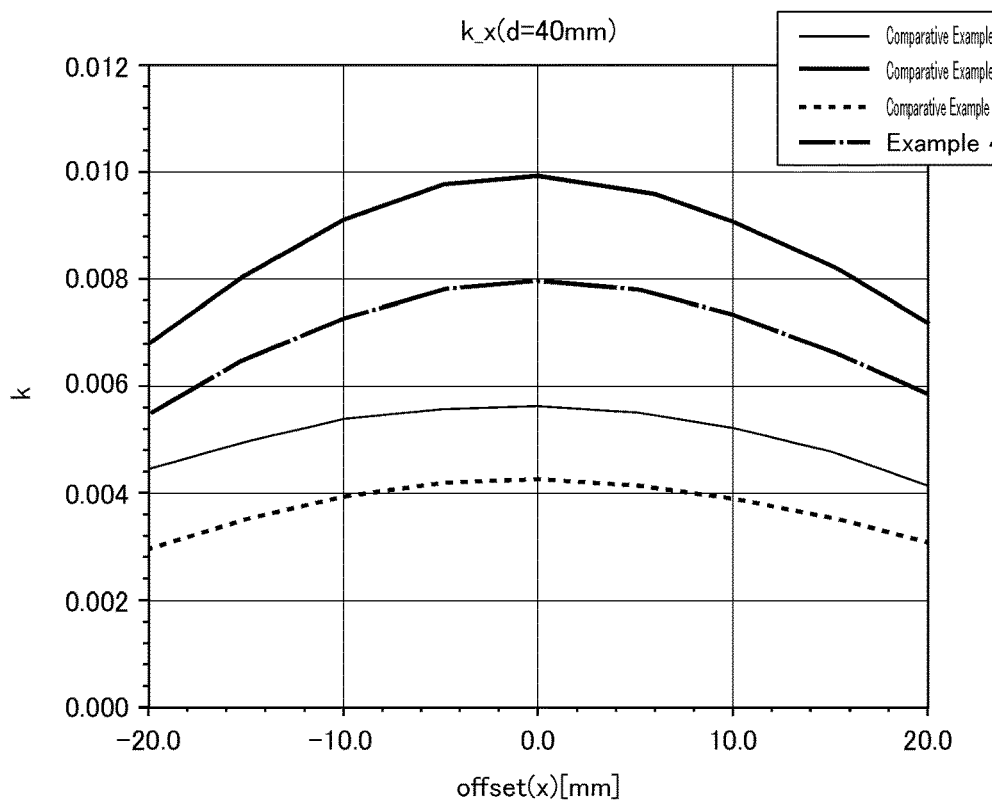
FIGS. 17A and 17B are graphs illustrating evaluation results of communication performance for confirming action and effect of the antenna device relating to example 4 of a variant of second embodiment of the present invention, and the antenna device relating to comparative example 3, comparative example 4, and comparative example 4'.
Figure 17B:
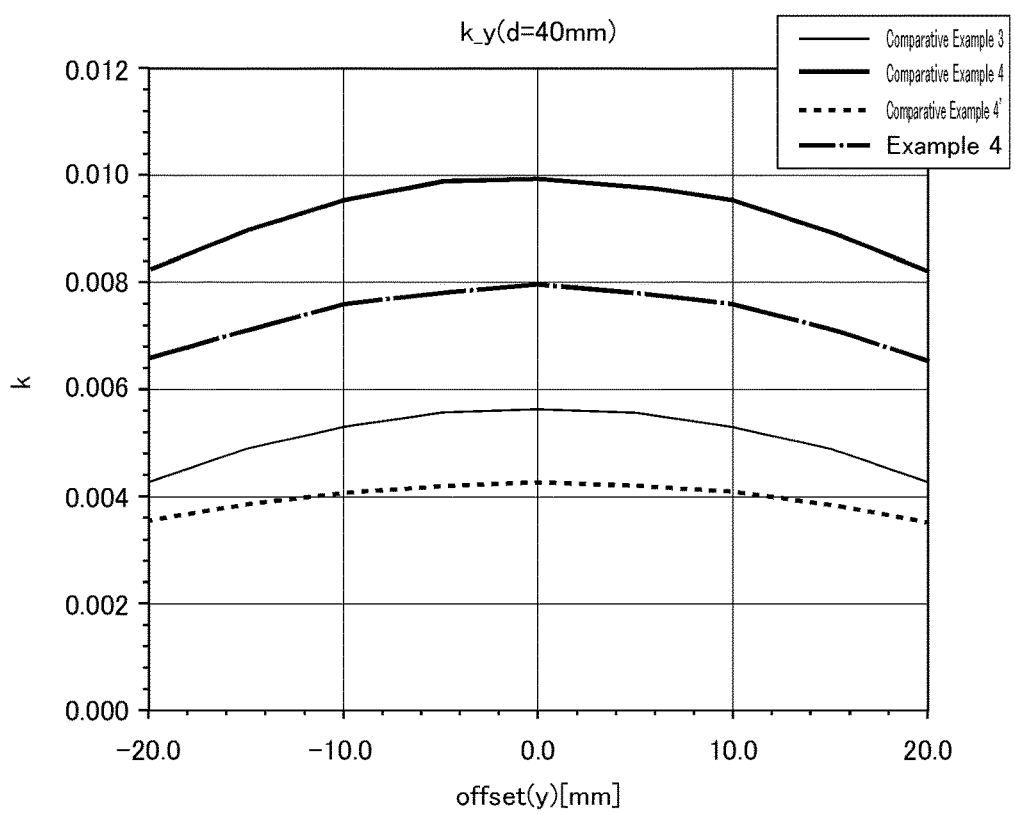

FIGS. 17A and 17B are graphs illustrating evaluation results of communication performance for confirming action and effect of the antenna device relating to example 4 of a variant of second embodiment of the present invention, and the antenna device relating to comparative example 3, comparative example 4, and comparative example 4'.

As illustrated in FIGS. 17A and 17B, from a result of comparative example 3 and comparative example 4, it was understood that a performance can be improved nearly twice with an antenna of same area by configuring the antenna as a slim antenna corresponding to metal. On the other hand, from a result of comparative example 4 and comparative example 4', it was understood that characteristics is decreased significantly when a width of the antenna was formed to be thin until 5 mm of conventional type as prior art, in order not to interfere with components inside of the portable device. In contrast, from a result of example 4 relating to second embodiment of the present invention, it was possible to achieve improvement in characteristics more than about 40% compared to the conventional type, even the recess 121 is provided at the antenna to avoid interference with components. In addition, an area of the antenna was reduced for 25%.

Figure 18A:
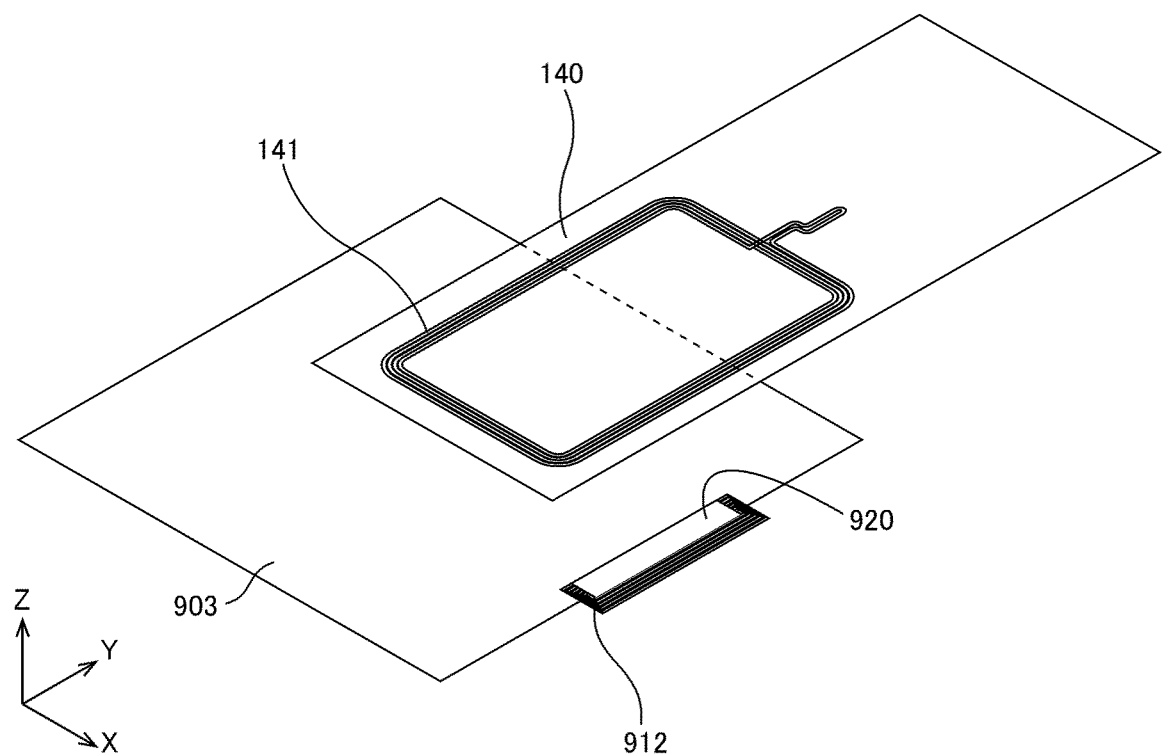
FIG. 18A is a perspective view illustrating an evaluation method for confirming action and effect of conventional antenna device as comparative examples 5 to 7.

Next, explaining about a basic verification and evaluation for confirming an effect relating to a change of coupling coefficient with a reader/writer of the antenna device relating to third embodiment of the present invention, using the drawings. FIG. 18A is a perspective view illustrating an evaluation method for confirming action and effect of conventional antenna device as comparative examples 5 to 7, and FIG. 18B is a planar view illustrating the evaluation method.

Figure 18B:
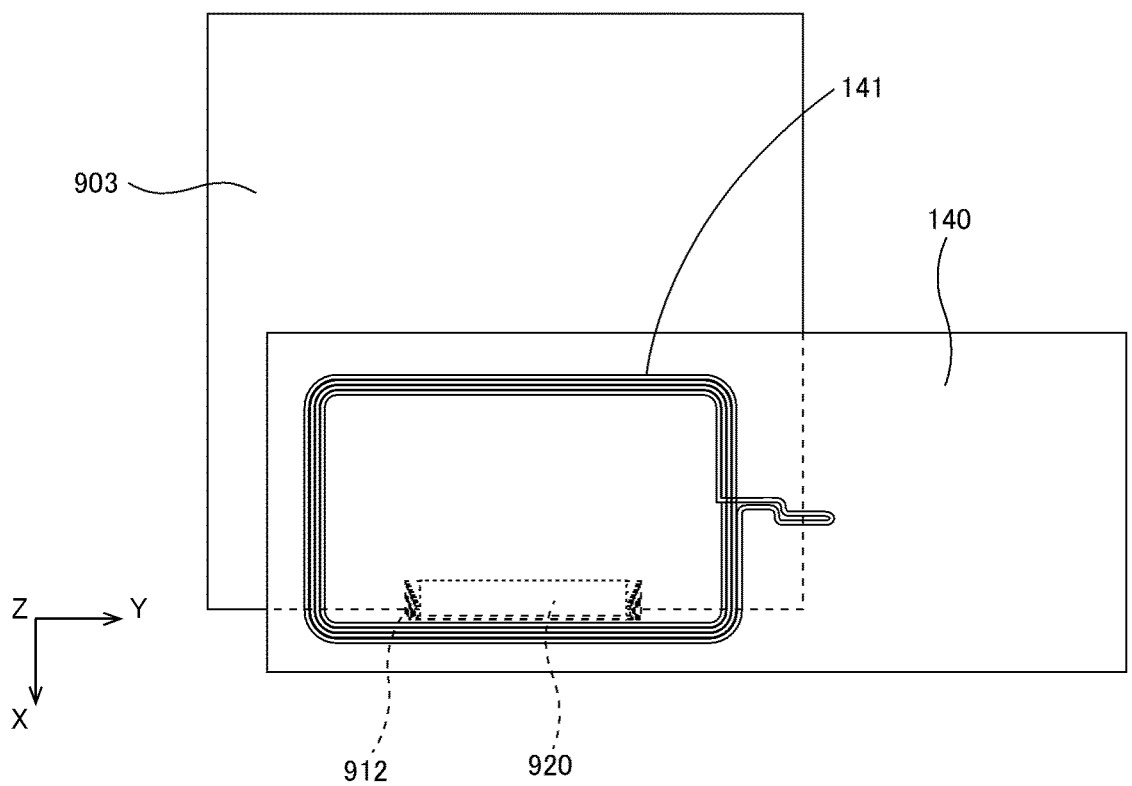
FIG. 18B is a planar view illustrating the evaluation method.

In comparative example 5 as prior art, as illustrated in FIGS. 18A and 18B, NFC antenna, in which a ferrite sheet 920 with a contour of 40 mm*12 mm and a thickness of 0.2 mm was inserted into an opening at a center of a coil 912 with a contour of 45 mm*12 mm formed by five turns of a conducting wire, was used. And, the NFC antenna was arranged at an end of an aluminum plate 903 of 100 mm*100 mm*0.3 mm with a gap of 0.15 mm. At this time, a half of an area of the NFC antenna was outside the aluminum plate 903. And, the NFC antenna and a coil 141 of Reference PICC 140 as external device were arranged in a distance of 40 mm, and distribution of magnetic coupling coefficient k was evaluated by moving the Reference PICC 140 respectively in X direction and Y direction with respect to the coil 912.

Similarly, comparative example 6, in which a contour of an antenna was 35 mm*12 mm (ferrite: 30 mm*12 mm), and comparative example 7, in which a contour of an antenna was 25 mm*12 mm (ferrite: 20 mm*12 mm), were evaluated respectively. An amount of ferrite sheet used for each antenna was −25% and −50% of comparative example 5 respectively.

Figure 19A:
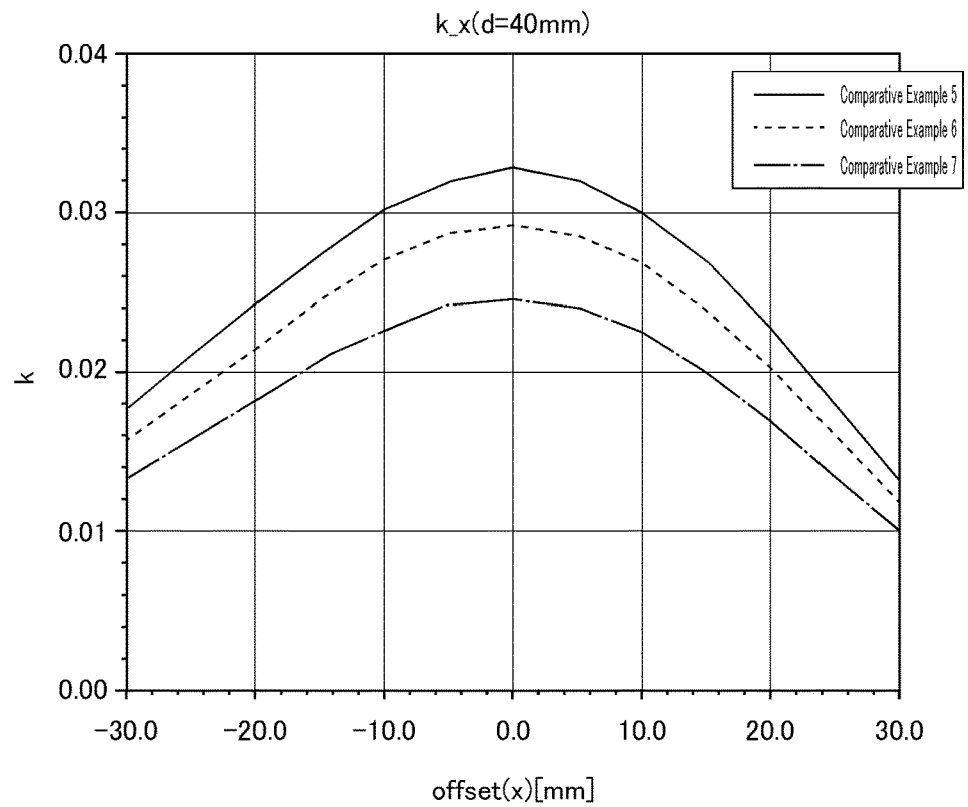
FIGS. 19A and 19B are graphs illustrating evaluation results of communication performance for confirming action and effect of the antenna device relating to comparative examples 5 to 7.
Figure 19B:
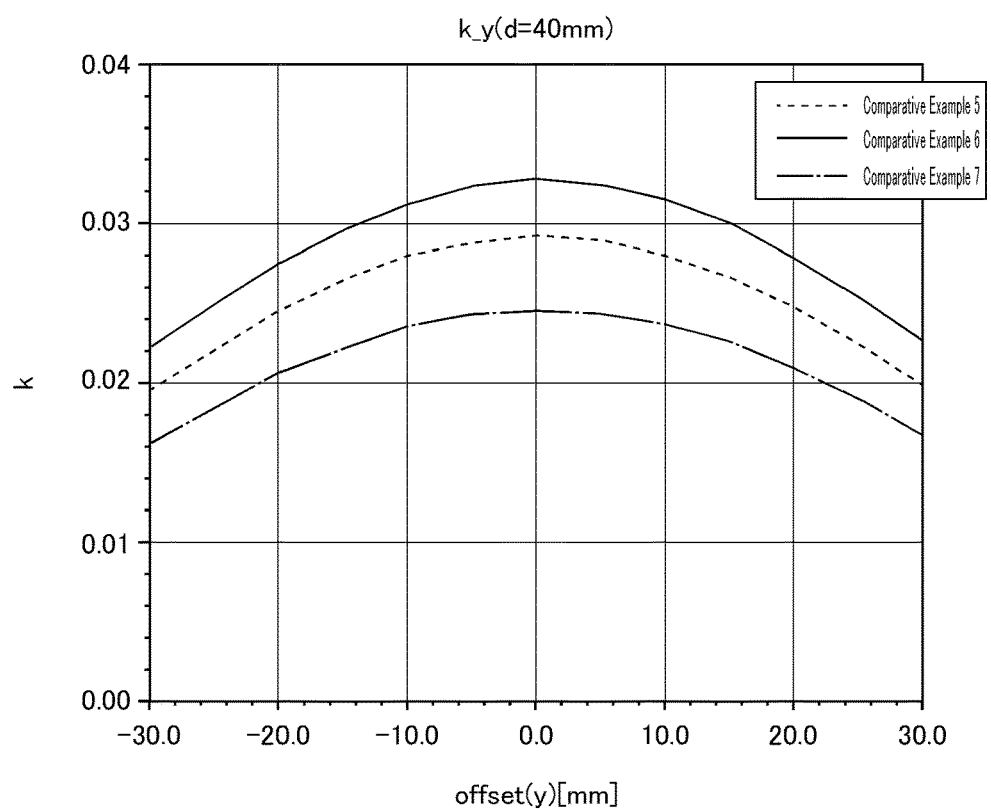

FIGS. 19A and 19B are graphs illustrating evaluation results of communication performance for confirming action and effect of the antenna device relating to comparative examples 5 to 7. As illustrated in FIGS. 19A and 19B, it was understood that communication performance was decreased as a value of magnetic coupling coefficient k was reduced when an amount of ferrite sheet was reduced along with a decrease of an area of the antenna.

On the other hand, NFC antenna of example 5 relating to a variant of third embodiment of the present invention was a slim type antenna in which a ferrite sheet 520 was inserted into an opening 512*b* at a center of a quintuple wound coil 512 of 50 mm*12 mm, and an opening 521 of 12 mm*10 mm was provided at a position in center side of the ferrite sheet 520. And, the coil 512 and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil 512.

On the other hand, NFC antenna of example 5' relating to a variant of third embodiment of the present invention was a slim type antenna in which a ferrite sheet 520 was inserted into an opening 512*b* at a center of a quintuple wound coil 512 of 50 mm*12 mm, and an opening 521 of 24 mm*10 mm was provided at a position in center side of the ferrite sheet 520. And, similarly, the coil 512 and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil 512.

Figure 20A:
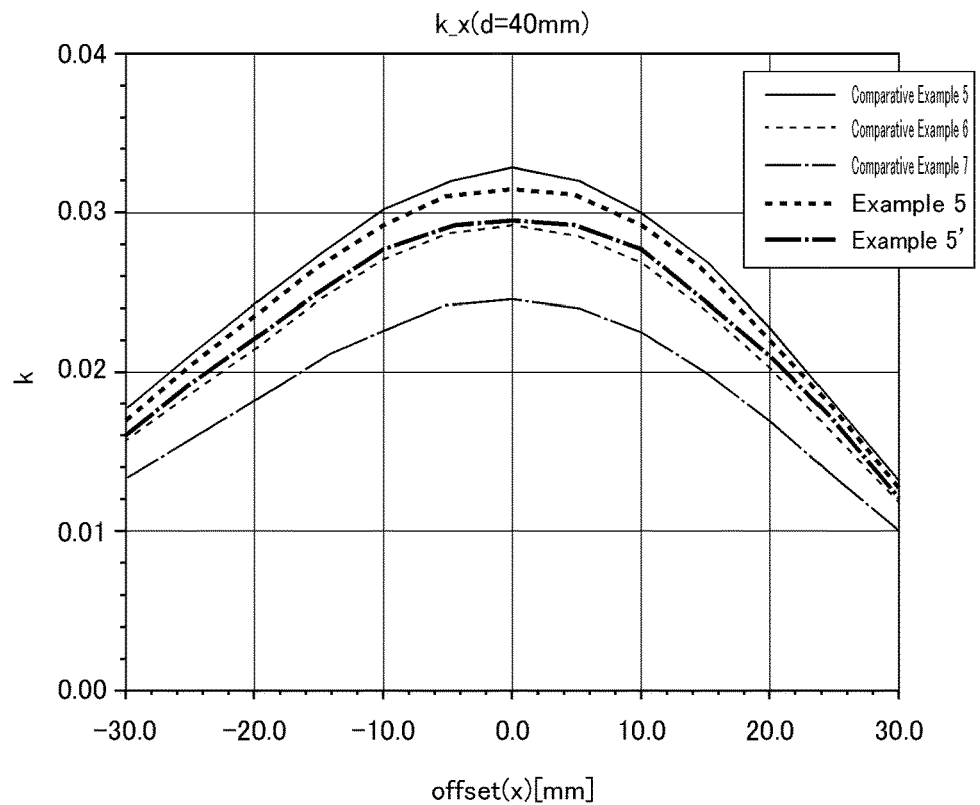
FIGS. 20A and 20B are graphs illustrating evaluation results of communication performance for confirming action and effect of the antenna device relating to example 5 and example 5' which are variants of third embodiment of the present invention, and the antenna device relating to comparative example 5, comparative example 6, and comparative example 7.
Figure 20B:
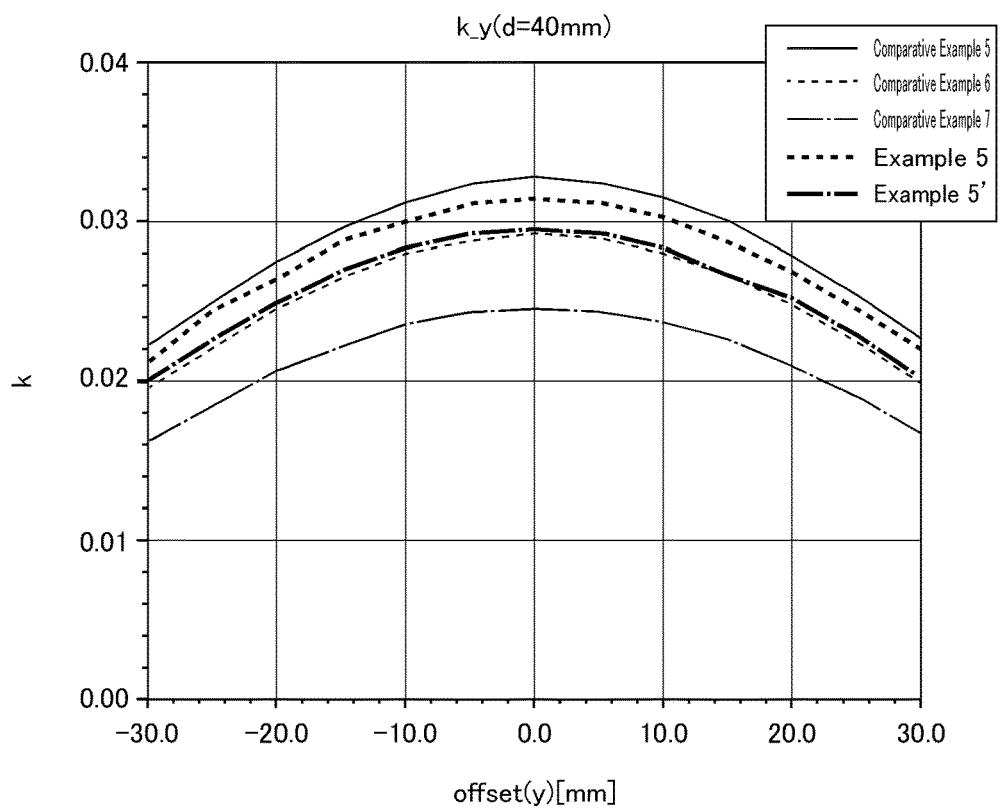

FIGS. 20A and 20B are graphs illustrating evaluation results of communication performance for confirming action and effect of the antenna device relating to example 5 and example 5' which are variants of third embodiment of the present invention, and the antenna device relating to comparative example 5, comparative example 6, and comparative example 7.

In comparative examples 5 to 7, a value of magnetic coupling coefficient k was decreased as an area of ferrite sheet was reduced, but it was understood that, in example 5 and example 5' in which the opening 521 was provided at center side of the ferrite sheet 520 without changing a size in length direction (Y direction) of the ferrite sheet 520, communication characteristics was improved significantly, even a used amount of ferrite was respectively identical with the used amount of comparative example 6 and comparative example 7. Concretely, comparative example 6 (−25%) and example 5' (−50%) were having approximately identical communication characteristics. In other words, it was understood that it is possible to secure higher communication performance by arranging the magnetic sheet 520 to overlap with the antenna coil 512 mutually along the antenna coil 512 by inserting the magnetic sheet 520 into the coil opening such that the magnetic sheet 520 is arranged over both ends of the coil opening, even when used amount of ferrite composing the ferrite sheet 520 is reduced for same amount.

In contrast, NFC antenna of example 6 relating to third embodiment of the present invention was a slim type antenna in which a ferrite sheet 420 was inserted into an opening 412*b* at a center of a quintuple wound coil 412 of 50 mm*12 mm, and an opening 421 of 12 mm*10 mm was provided at a position in center side of the ferrite sheet 420. And, the coil 412 and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil 412.

On the other hand, NFC antenna of example 6' relating to third embodiment of the present invention was a slim type antenna in which a ferrite sheet 420 was inserted into an opening 412*b* at a center of a quintuple wound coil 412 of 50 mm*12 mm, and an opening 421 of 24 mm*10 mm was provided at a position in center side of the ferrite sheet 420. And, similarly, the coil 412 and an antenna having a circular coil with a diameter of 70 mm formed by two turns of a conducting wire in a pitch of 1.5 mm were arranged in a distance of 40 mm, and distribution of magnetic coupling coefficient k was evaluated by moving the antenna respectively in X direction and Y direction with respect to the coil 412.

Figure 21A:
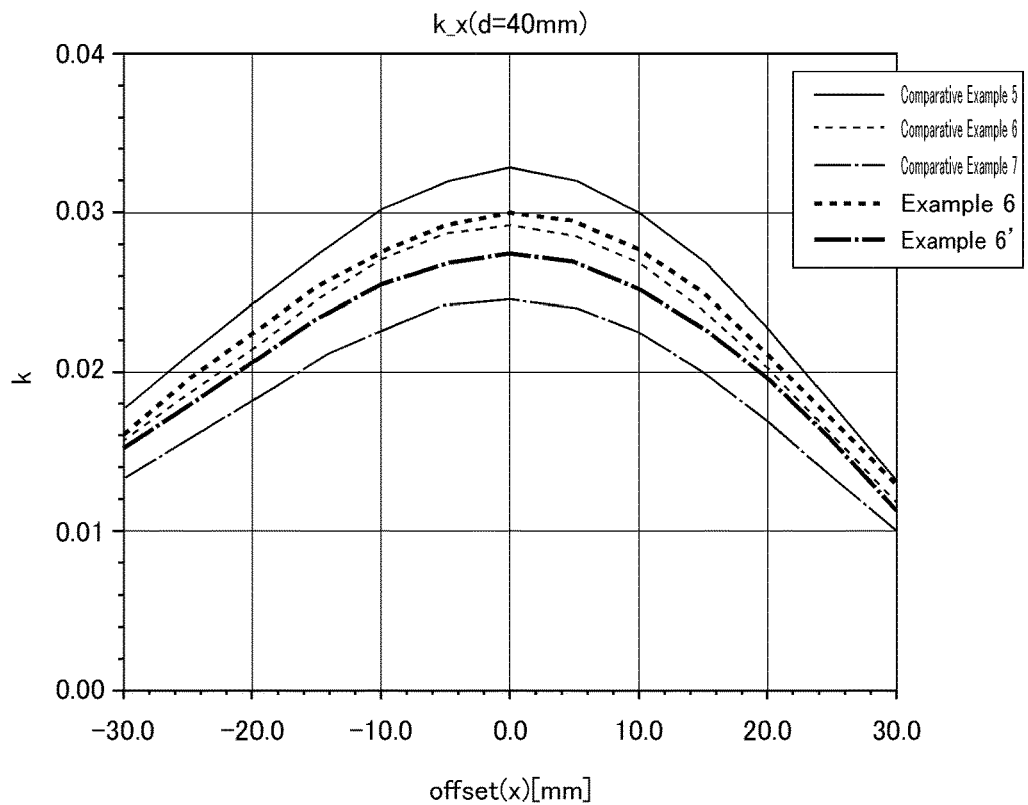
FIGS. 21A and 21B are graphs illustrating evaluation results of communication performance for confirming action and effect of the antenna device relating to example 6 and example 6' of third embodiment of the present invention, and the antenna device relating to comparative example 5, comparative example 6, and comparative example 7.
Figure 21B:
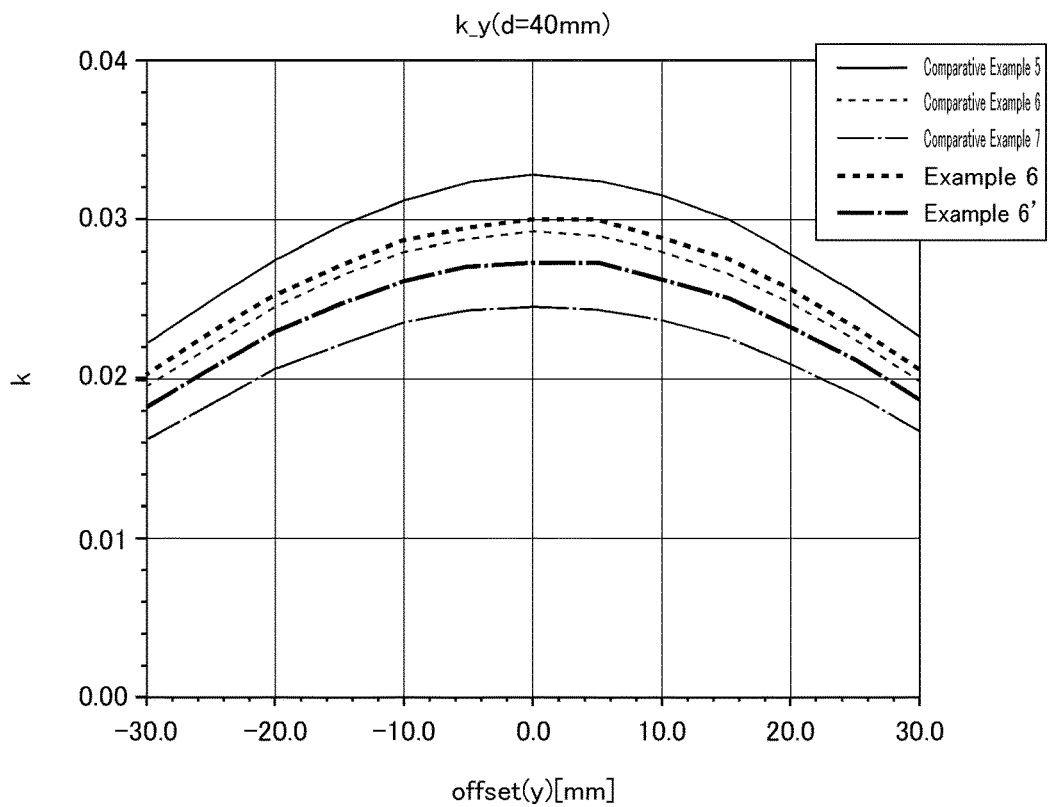

FIGS. 21A and 21B are graphs illustrating evaluation results of communication performance for confirming action and effect of the antenna device relating to example 6 and example 6' of third embodiment of the present invention, and the antenna device relating to comparative example 5, comparative example 6, and comparative example 7.

In the above comparative examples 5 to 7, a value of magnetic coupling coefficient k was decreased as an area of ferrite sheet was reduced, but it was understood that, in example 6 and example 6' in which the opening 421 was provided at center side of the ferrite sheet 420 without changing a size in length direction (Y direction) of the ferrite sheet 420, and also, in which the antenna coil 412 was wound around to bypass the opening 421, communication characteristics was improved significantly, even a used amount of ferrite was respectively identical with the used amount of comparative example 6 and comparative example 7. In addition, an effect of improvement with respect to comparative examples 5 to 7 was decreased compared to the above example 5, but it will be possible to arrange components such as a connector in the opening 421 at a center of the antenna, so it was understood that restriction in mounting will be improved significantly.

In addition, we have explained in detail about each embodiment and each example of the present invention as above, but it would be easy for those who skilled in the art to understand that various modifications are possible without substantively departing from new matters and effect of the present invention. Therefore, all of these modifications should be included in a scope of the present invention.

For example, terms described with different terms having broader or equivalent meaning at least once in description and drawings can be replaced with these different terms in any part of description and drawings. In addition, configuration and operation of the antenna device are also not limited to those explained in each embodiment and each example of the present invention and it can be performed with various modifications.

Glossary of Drawing References

1 Antenna device
2 Antenna module
3, 103, 403 Metal plate
5, 105, 205, 405 Metallic cover
6, 106, 206, 406 Opening
11, 111, 211, 311, 411, 511 Antenna substrate
12, 112, 212, 312, 412, 512 Antenna coil
12*a*, 112*a*, 212*a*, 312*a*, 412*a*, 512*a* Conducting wire
12*a*1, 112*a*1, 212*a*1, 312*a*1, 412*a*1, 512*a*1 One side part
12*a*2, 112*a*2, 212*a*2, 312*a*2, 412*a*2, 512*a*2 Other side part
12*b*, 112*b*, 212*b*, 312*b*, 412*b*, 512*b* Coil opening
13 Communication processing unit
14 Terminal area
20, 120, 220, 320, 420, 520 Magnetic sheet
30 Electronic apparatus
40 Reader/writer (External device)
41 Antenna
42 Control board
43 Control circuit
121, 221, 321 Recess (Absent part)
421, 521 Opening (Absent part)
L1 Center line

The invention claimed is:

1. An antenna device incorporated in an electronic apparatus and communicating with an external device via an electromagnetic field signal, the antenna device comprising:
   an antenna coil inductively coupled to the external device, the antenna coil being formed by winding around a conducting wire in planar shape;
   a magnetic sheet arranged to overlap with the antenna coil mutually along the antenna coil by inserting the magnetic sheet into a coil opening provided at center side of the antenna coil; and
   a metallic cover formed with an opening near an end of the metallic cover and arranged at surface side of the antenna coil opposing to the external device, the antenna coil being arranged to overlap with the metallic cover in a region between the opening and the end of the metallic cover at a backside surface of the metallic cover opposite to a surface of the metallic cover opposing to the external device, the magnetic sheet being formed with an absent part at a position overlapped with the opening of the metallic cover, the magnetic sheet extending along the metallic cover, then bending downward to extend through an opening in an antenna substrate on which the antenna coil is formed, and then extending on an opposite side of the antenna substrate relative to the metallic cover, and the antenna coil and the magnetic sheet are arranged not to overlap with the opening of the metallic cover.

2. The antenna device according to claim 1, wherein the antenna coil has an elongated rectangular shape formed by winding around the conducting wire such that conducting wires opposing in a width direction via the coil opening are proximate to each other.

3. The antenna device according to claim 2, wherein the magnetic sheet is arranged to overlap with the antenna coil mutually along the antenna coil by inserting the magnetic sheet into the coil opening such that the magnetic sheet is provided over both ends of the coil opening.

4. The antenna device according to claim 1, wherein the antenna coil is wound around to bypass the absent part.

5. The antenna device according to claim 4, wherein the absent part is a recess formed to reduce an area of the magnetic sheet when the magnetic sheet is viewed in a planar view.

6. The antenna device according to claim 5, wherein the antenna coil is divided into a first side part in which the conducting wire is wound around in one direction and a second side part in which the conducting wire is wound around in another direction, the antenna coil being divided via a center line longitudinally traversing the coil opening, and intervals of the conducting wire of the first side part are identical with intervals of the conducting wire of the second side part.

7. The antenna device according to claim 4, wherein the absent part is an opening formed to reduce an area of the magnetic sheet when the magnetic sheet is viewed in a planar view.

8. The antenna device according to claim 1, wherein the magnetic sheet is arranged to overlap with the antenna coil mutually along the antenna coil by inserting the magnetic sheet into the coil opening such that the magnetic sheet is provided over both ends of the coil opening.

* * * * *